US012761332B2

(12) United States Patent
Sugawara et al.

(10) Patent No.: US 12,761,332 B2
(45) Date of Patent: Oct. 13, 2026

(54) OPTICAL TESTING APPARATUS

(71) Applicant: ADVANTEST CORPORATION, Tokyo (JP)

(72) Inventors: Toshihiro Sugawara, Gunma (JP); Takao Sakurai, Miyagi (JP)

(73) Assignee: ADVANTEST CORPORATION, Tokyo (JP)

( * ) Notice: Subject to any disclaimer, the term of this patent is extended or adjusted under 35 U.S.C. 154(b) by 1078 days.

(21) Appl. No.: 17/785,680

(22) PCT Filed: Oct. 9, 2020

(86) PCT No.: PCT/JP2020/038304

§ 371 (c)(1),
(2) Date: Jun. 15, 2022

(87) PCT Pub. No.: WO2021/161583

PCT Pub. Date: Aug. 19, 2021

(65) Prior Publication Data

US 2023/0048446 A1 Feb. 16, 2023

(30) Foreign Application Priority Data

Feb. 13, 2020 (JP) ................................ 2020-022418

(51) Int. Cl.
*G01S 7/4865* (2020.01)
*G01S 7/481* (2006.01)
(Continued)

(52) U.S. Cl.
CPC ........... *G01S 7/4972* (2013.01); *G01S 7/4811* (2013.01); *G01S 7/4818* (2013.01); *G01S 7/4865* (2013.01);
(Continued)

(58) Field of Classification Search
CPC .... G01S 7/4972; G01S 7/4811; G01S 7/4818; G01S 7/4865; G01S 7/4915; G01S 17/08; G01S 17/89
See application file for complete search history.

(56) References Cited

U.S. PATENT DOCUMENTS 3,836,256 A * 9/1974 Peters ...................... G01J 9/02 356/124
8,368,876 B1 * 2/2013 Johnson ................. G01S 17/89 356/3.01
2007/0024842 A1 * 2/2007 Nishizawa ............. G01S 7/487 356/5.01

FOREIGN PATENT DOCUMENTS

CN 109031250 A 12/2018
JP H06-289137 A 10/1994
(Continued)

OTHER PUBLICATIONS

International Search Report (including English Language Translation), by the Japan Patent Office (JPO), issued in International Patent Application No. PCT/JP2020/038304.

*Primary Examiner* — Helal A Algahaim
*Assistant Examiner* — Robert W Vasquez
(74) *Attorney, Agent, or Firm* — Greenblum & Bernstein, P.L.C.

(57) ABSTRACT

An optical testing apparatus is used in testing an optical measuring instrument that provides incident light from a light source to an incident object and receives reflected light of the incident light at the incident object. The apparatus includes an incident light receiving section, a light signal providing section, an imaging section, and an optical axis misalignment deriving section. The incident light receiving section receives incident light. The light signal providing section provides a light signal to an incident object after a predetermined delay time since the incident light receiving (Continued)

section has received the incident light. The imaging section images the incident light. The optical axis misalignment deriving section derives misalignment of the optical axis of the incident light with respect to the incident light receiving section based on misalignment between the incident light receiving section and the imaging section as well as an imaging result with the imaging section.

16 Claims, 23 Drawing Sheets

(51) Int. Cl.
*G01S 7/4915* (2020.01)
*G01S 7/497* (2006.01)
*G01S 17/08* (2006.01)
*G01S 17/89* (2020.01)

(52) U.S. Cl.
CPC ............ *G01S 7/4915* (2013.01); *G01S 17/08* (2013.01); *G01S 17/89* (2013.01)

(56) References Cited

FOREIGN PATENT DOCUMENTS

| | | | |
|---|---|---|---|
| JP | 2000-275340 | A | 10/2000 |
| JP | 2006-126168 | A | 5/2006 |
| JP | 2017-015729 | A | 1/2017 |

* cited by examiner

In case where Optical Axis of Incident Light runs through Center of Photodetector In case where Optical Axis of Incident Light does not run through Center of Photodetector

OPTICAL TESTING APPARATUS

TECHNICAL FIELD

The present invention relates to testing an instrument arranged to receive reflected light.

BACKGROUND ART

There has conventionally been known a distance measuring instrument arranged to provide incident light to a distance measuring object and receive reflected light. The distance between the distance measuring instrument and the distance measuring object is measured (see Patent Literatures 1, 2, and 3, for example).

CITATION LIST

Patent Literature

Patent Literature 1: Japanese Patent Application Publication No. 2017-015729

Patent Literature 2: Japanese Patent Application Publication No. 2006-126168

Patent Literature 3: Japanese Patent Application Publication No. 2000-275340

SUMMARY OF THE INVENTION

Technical Problem

Such a related art distance measuring instrument as described above is tested with the distance measuring instrument being spaced away from the distance measuring object by a measurement expected distance. For example, if the distance measuring instrument is assumed to be an in-vehicle LiDAR module, the measurement expected distance (hereinafter referred to possibly as "expected distance") is approximately 200 m.

However, such testing as described above suffers from a problem in that the distance measuring instrument has to be actually spaced away from the distance measuring object by an expected distance. For example, such testing inevitably requires an extensive site (e.g. a square site of 200 m×200 m).

It is hence an object of the present invention to prevent, in testing an instrument arranged to receive reflected light, the distance between the instrument and a measuring object (or an alternative to the measuring object) from increasing.

Means for Solving the Problem

According to first aspect of the present invention, an optical testing apparatus used in testing an optical measuring instrument that provides incident light from a light source to an incident object and receives reflected light as a result of reflection of the incident light at the incident object, includes: an incident light receiving section arranged to receive the incident light; a light signal providing section arranged to provide a light signal to an incident object after a predetermined delay time since the incident light receiving section has received the incident light; an imaging capture section arranged to image the incident light; and an optical axis misalignment deriving section arranged to derive misalignment of the optical axis of the incident light with respect to the incident light receiving section based on misalignment between the incident light receiving section and the imaging capture section as well as an imaging result with the imaging capture section, wherein a reflected light signal is provided to the optical measuring instrument as a result of reflection of the light signal at the incident object, and the delay time is approximately equal to the time between emission of the incident light from the light source and reception of the reflected light by the optical measuring instrument in the case of actually using the optical measuring instrument.

According to the thus constructed optical testing apparatus, an optical testing apparatus used in testing an optical measuring instrument that provides incident light from a light source to an incident object and receives reflected light as a result of reflection of the incident light at the incident object, can be provided. An incident light receiving section receives the incident light. A light signal providing section provides a light signal to an incident object after a predetermined delay time since the incident light receiving section has received the incident light. An imaging capture section images the incident light. An optical axis misalignment deriving section derives misalignment of the optical axis of the incident light with respect to the incident light receiving section based on misalignment between the incident light receiving section and the imaging capture section as well as an imaging result with the imaging capture section. a reflected light signal is provided to the optical measuring instrument as a result of reflection of the light signal at the incident object. The delay time is approximately equal to the time between emission of the incident light from the light source and reception of the reflected light by the optical measuring instrument in the case of actually using the optical measuring instrument.

According to second aspect of the present invention, an optical testing apparatus used in testing an optical measuring instrument that provides incident light from a light source to an incident object and receives reflected light as a result of reflection of the incident light at the incident object, includes: an incident light receiving section arranged to receive the incident light; a light signal providing section arranged to output a light signal after a predetermined delay time since the incident light receiving section has received the incident light; a light traveling direction changing section arranged to emit the light signal toward the optical measuring instrument; an imaging capture section arranged to image the incident light; and an optical axis misalignment deriving section arranged to derive misalignment of the optical axis of the incident light with respect to the incident light receiving section based on misalignment between the incident light receiving section and the imaging capture section as well as an imaging result with the imaging capture section, wherein a direction changed light signal is provided to the optical measuring instrument as a result of change in the traveling direction of the light signal at the light traveling direction changing section, and the delay time is approximately equal to the time between emission of the incident light from the light source and reception of the reflected light by the optical measuring instrument in the case of actually using the optical measuring instrument.

According to the thus constructed optical testing apparatus, an optical testing apparatus used in testing an optical measuring instrument that provides incident light from a light source to an incident object and receives reflected light as a result of reflection of the incident light at the incident object, can be provided. An incident light receiving section receives the incident light. A light signal providing section outputs a light signal after a predetermined delay time since the incident light receiving section has received the incident light. A light traveling direction changing section emits the light signal toward the optical measuring instrument. An imaging capture section images the incident light. An optical axis misalignment deriving section derives misalignment of the optical axis of the incident light with respect to the incident light receiving section based on misalignment between the incident light receiving section and the imaging capture section as well as an imaging result with the imaging capture section. A direction changed light signal is provided to the optical measuring instrument as a result of change in the traveling direction of the light signal at the light traveling direction changing section. The delay time is approximately equal to the time between emission of the incident light from the light source and reception of the reflected light by the optical measuring instrument in the case of actually using the optical measuring instrument.

According to second aspect of the present invention, the light traveling direction changing section may be arranged to branch the light signal into two or more emission light beams.

According to third aspect of the present invention, an optical testing apparatus used in testing an optical measuring instrument that provides incident light from a light source to an incident object and receives reflected light as a result of reflection of the incident light at the incident object, includes: an incident light receiving section arranged to receive the incident light; a light signal providing section arranged to provide a light signal to the optical measuring instrument after a predetermined delay time since the incident light receiving section has received the incident light; an imaging capture section arranged to image the incident light; and an optical axis misalignment deriving section arranged to derive misalignment of the optical axis of the incident light with respect to the incident light receiving section based on misalignment between the incident light receiving section and the imaging capture section as well as an imaging result with the imaging capture section, wherein the delay time is approximately equal to the time between emission of the incident light from the light source and reception of the reflected light by the optical measuring instrument in the case of actually using the optical measuring instrument.

According to the thus constructed optical testing apparatus, an optical testing apparatus used in testing an optical measuring instrument that provides incident light from a light source to an incident object and receives reflected light as a result of reflection of the incident light at the incident object, can be provided. An incident light receiving section is arranged to receive the incident light. A light signal providing section is arranged to provide a light signal to the optical measuring instrument after a predetermined delay time since the incident light receiving section has received the incident light. An imaging capture section is arranged to image the incident light. An optical axis misalignment deriving section is arranged to derive misalignment of the optical axis of the incident light with respect to the incident light receiving section based on misalignment between the incident light receiving section and the imaging capture section as well as an imaging result with the imaging capture section. The delay time is approximately equal to the time between emission of the incident light from the light source and reception of the reflected light by the optical measuring instrument in the case of actually using the optical measuring instrument.

According to first, second and third aspects of the present invention, the incident light receiving section may be arranged to convert the incident light into an electrical signal, and the light signal providing section may be arranged to convert the electrical signal delayed by the delay time into the light signal.

According to first, second and third aspects of the present invention, the optical testing apparatus may further include electrical signal delaying sections each arranged to delay the electrical signal by the delay time.

According to first, second and third aspects of the present invention, the delay time may be variable in the electrical signal delaying sections.

According to first, second and third aspects of the present invention, the electrical signal delaying sections may have their respective different delay times, and one of the electrical signal delaying sections may be selected for use.

According to first, second and third aspects of the present invention, the incident light receiving section may be arranged to convert the incident light into an electrical signal, the optical testing apparatus may further include an output control section arranged to, based on the electrical signal, cause the light signal providing section to output the light signal after the delay time since the incident light receiving section has received the incident light.

According to first, second and third aspects of the present invention, the light signal providing section may be arranged to delay the incident light by the delay time to be the light signal.

According to first, second and third aspects of the present invention, the optical testing apparatus may further include an optical attenuator arranged to attenuate the power of the light signal, wherein the level of attenuation is variable in the optical attenuator.

According to fourth aspect of the present invention, an optical testing apparatus used in testing an optical measuring instrument that provides incident light from a light source to an incident object and receives reflected light as a result of reflection of the incident light at the incident object, includes: an imaging capture section arranged to image the incident light; and an optical axis misalignment deriving section arranged to derive misalignment of the optical axis of the incident light with respect to the incident object based on misalignment between the incident object and the imaging capture section as well as an imaging result with the imaging capture section.

According to the thus constructed optical testing apparatus, an optical testing apparatus used in testing an optical measuring instrument that provides incident light from a light source to an incident object and receives reflected light as a result of reflection of the incident light at the incident object, can be provided. An imaging capture section images the incident light. An optical axis misalignment deriving section derives misalignment of the optical axis of the incident light with respect to the incident object based on misalignment between the incident object and the imaging capture section as well as an imaging result with the imaging capture section.

According to first, second, third and fourth aspects of the present invention, the misalignment of the optical axis may be provided to an instrument moving section arranged to move the optical measuring instrument, and the instrument moving section may be arranged to move the optical measuring instrument such that the misalignment of the optical axis of the incident light is removed.

According to first, second, third and fourth aspects of the present invention, the instrument moving section may be arranged to move the optical measuring instrument in a plane orthogonal to the optical axis of the incident light.

According to first, second, third and fourth aspects of the present invention, the instrument moving section may be arranged to rotate the optical measuring instrument around a rotational axis orthogonal to the optical axis of the incident light.

According to first, second, third and fourth aspects of the present invention, the optical measuring instrument may be moved manually before the instrument moving section moves the optical measuring instrument.

According to first, second, third and fourth aspects of the present invention, the reflectance of the incident object may be variable.

According to the present invention, a semiconductor test apparatus may include an optical testing apparatus according to any one of first, second, third and fourth aspects of the present invention and a testing section arranged to conduct a test on measurements using the optical measuring instrument.

MODES FOR CARRYING OUT THE INVENTION

A description will now be given of embodiments of the present invention referring to drawings.

First Embodiment

Figure 1A:
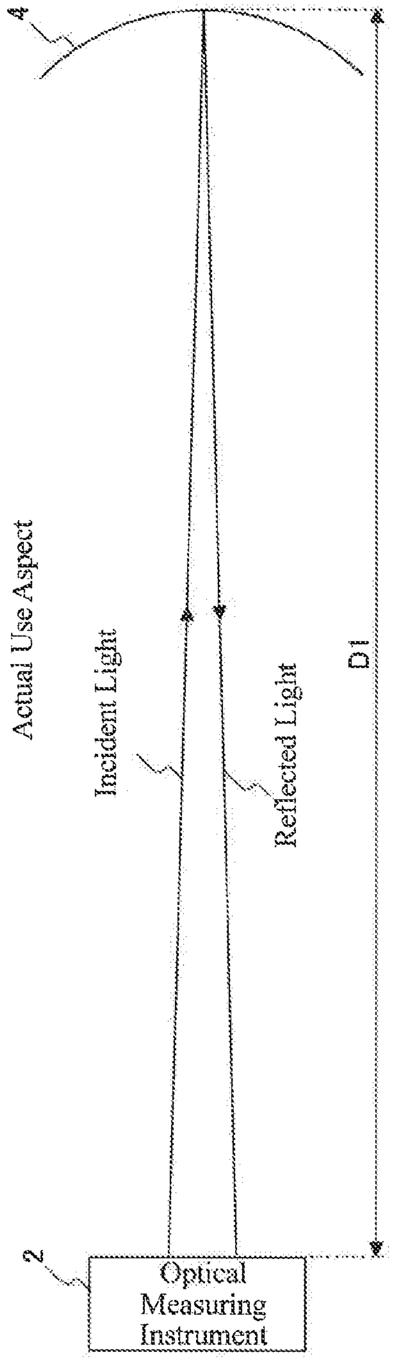
FIGS. 1 (*a*) and 1 (*b*) show an actual use aspect (FIG. 1 (*a*)) and a testing use aspect (FIG. 1 (*b*)) of an optical measuring instrument 2.
Figure 1B:
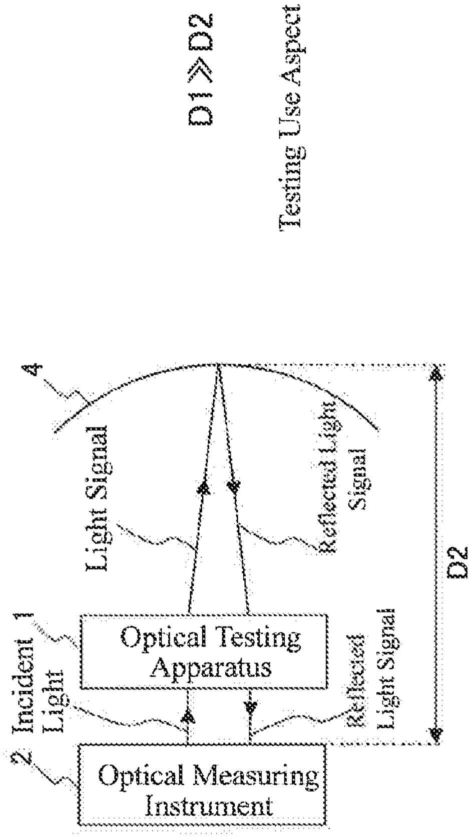
Figure 2:
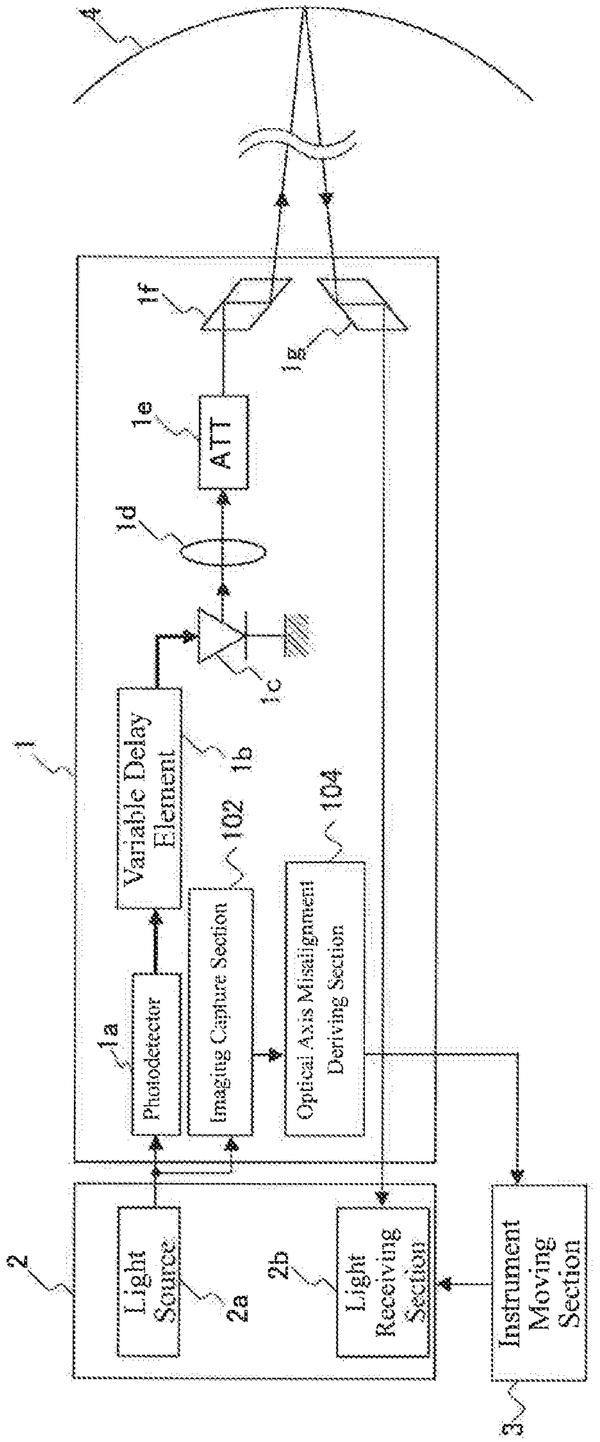
FIG. 2 is a functional block diagram showing the configuration of an optical testing apparatus 1 according to a first embodiment of the present invention.

FIG. 1 shows an actual use aspect (FIG. 1 (*a*)) and a testing use aspect (FIG. 1 (*b*)) of an optical measuring instrument 2. FIG. 2 is a functional block diagram showing the configuration of an optical testing apparatus 1 according to a first embodiment of the present invention.

Referring to FIG. 1 (*a*), in the actual use aspect, the optical measuring instrument 2 is arranged to provide incident light from a light source 2*a* (see FIG. 2) to an incident object 4. The incident light is arranged to be reflected at the incident object 4 to be reflected light and received by a light receiving section 2*b* (see FIG. 2) of the optical measuring instrument 2. The optical measuring instrument 2 is, for example, a LiDAR module and used to measure the distance D1 between the optical measuring instrument 2 and the incident object 4. It is noted that if the optical measuring instrument 2 is a LiDAR module, the distance D1 is, for example, 200 m.

Measuring the distance D1 may include the steps of (1) measuring the time between emission of incident light from the light source 2*a* and reception of reflected light by the optical measuring instrument 2 and (2) multiplying the time measured in step (1) by the speed of light and then ½ to obtain the distance D1. Note that in the embodiments of the present invention, the steps (1) and (2) above should be performed in a module different from the optical measuring instrument 2 (see FIG. 15).

It is noted that the incident object 4 is, for example, a reflector.

Referring to FIG. 1 (*b*), the optical testing apparatus 1 is used to test the optical measuring instrument 2. The testing is intended to, for example, check whether or not the optical measuring instrument 2 can accurately measure the distance D1.

In the testing use aspect, the optical testing apparatus 1 is disposed between the optical measuring instrument 2 and the incident object 4. The distance D2 between the optical measuring instrument 2 and the incident object 4 is much smaller than the distance D1 and is, for example, 1 m.

Incident light from the light source 2*a* (see FIG. 2) of the optical measuring instrument 2 is provided to the optical testing apparatus 1 and a light signal is provided to the incident object 4. The light signal is reflected at the incident object 4 to be a reflected light signal and passes through the optical testing apparatus 1 to be received by the light receiving section 2*b* (see FIG. 2) of the optical measuring instrument 2.

It is noted that the optical testing apparatus 1 and the optical measuring instrument 2 may be put in a constant temperature reservoir (the same applies to the other embodiments).

An instrument moving section 3 (see FIG. 2) is also provided (e.g. as a motor) to move the optical measuring instrument 2, in a manner separate from both the optical testing apparatus 1 and the optical measuring instrument 2, and not shown in FIG. 1. Note that the instrument moving section 3 may be a part of the optical testing apparatus 1 or a part of the optical measuring instrument 2. The same applies to instrument moving sections 3 according to other embodiments.

Referring to FIG. 2, the optical testing apparatus 1 according to the first embodiment includes a photodetector (incident light receiving section) 1*a*, a variable delay element (electrical signal delay section) 1*b*, a laser diode (light signal providing section) 1*c*, a lens 1*d*, an optical attenuator 1*e*, Galvano mirrors 1*f*, 1*g*, an imaging capture section 102, and an optical axis misalignment deriving section 104.

The photodetector (incident light receiving section) 1*a* is arranged to receive incident light and convert it into an electrical signal. The photodetector 1*a* is, for example, a photodetector.

The variable delay element (electrical signal delay section) 1*b* is arranged to delay an electrical signal output from the photodetector 1*a* by a predetermined delay time. Note that the delay time is approximately equal to the time between emission of incident light from the light source 2*a* and reception of reflected light by the optical measuring instrument 2 (i.e. 2×D1/c) in the case of actually using the optical measuring instrument 2 (see FIG. 1 (*a*)), where c is the speed of light. It is noted that if D1 is 200 m, 2×D1/c is about 1332 nanoseconds.

Note that the delay time may be 2×D1/c (falling within "approximately equal"). The delay time may also be 2×(D1−D2)/c. If the delay time is 2×(D1−D2)/c, which differs from 2×D1/c, the delay time is "approximately" equal to 2×D1/c because D2 is much smaller than D1.

It is noted that the delay time is variable in the variable delay element (electrical signal delay section) 1*b*. This allows for scaling with a change in the distance D1 in the case of actually using the optical measuring instrument 2.

The laser diode (light signal providing section) 1*c* is arranged to convert an output from the variable delay element 1*b* (i.e. a version of an electrical signal output from the photodetector 1*a* delayed by a predetermined delay time) into a light signal (e.g. a laser beam). Note that a driver circuit (not shown) may be connected between the laser diode 1*c* and the variable delay element 1*b* to provide an output from the variable delay element 1*b* to the laser diode 1*c* via the driver circuit. In this case, the driver circuit amplifies and provides an output current from the variable delay element 1*b* to the laser diode 1*c* as a current high enough to drive the laser diode 1*c*. Even in this case, the laser diode 1*c* remains to convert an output from the variable delay element 1*b* into a light signal (the same applies to the second and third embodiments). This allows the laser diode 1*c* to provide a light signal to the incident object 4 after a predetermined delay time since the photodetector 1*a* has received incident light. It should be noted that the time between reception of incident light by the photodetector 1*a* and provision of an electrical signal to the variable delay element 1*b* is approximately zero.

The lens 1*d* is a convex lens that receives a light signal output from the laser diode 1*c*.

The optical attenuator 1*e* is arranged to attenuate the power of a light signal penetrating through the lens 1*d* and provide it to the Galvano mirror 1*f*. The level of attenuation is variable. Thus attenuating the power of a light signal allows for testing in a model case where the power of incident light output from the light source 2*a* of the optical measuring instrument 2 is low.

The Galvano mirror 1*f* is arranged to receive an output from the optical attenuator 1*e* and provide a light signal to approximately the center of the incident object 4. The light signal is reflected at the incident object 4 to be a reflected light signal.

The Galvano mirror 1*g* is arranged to redirect the optical path of a reflected light signal toward the light receiving section 2*b* of the optical measuring instrument 2 and then provide the reflected light signal therethrough to the light receiving section 2*b*.

It is noted that without using the Galvano mirrors 1*f*, 1*g*, the optical attenuator 1*e* may be placed on a stage movable in two orthogonal axial directions (XY directions) or a stage angularly tiltable with respect to the incident object 4.

The imaging capture section 102 is arranged to image incident light. The optical axis misalignment deriving section 104 is arranged to derive misalignment of the optical axis of the incident light with respect to the photodetector (incident light receiving section) 1*a* based on misalignment between the photodetector 1*a* and the imaging capture section 102 as well as an imaging result with the imaging capture section 102.

Figure 16:
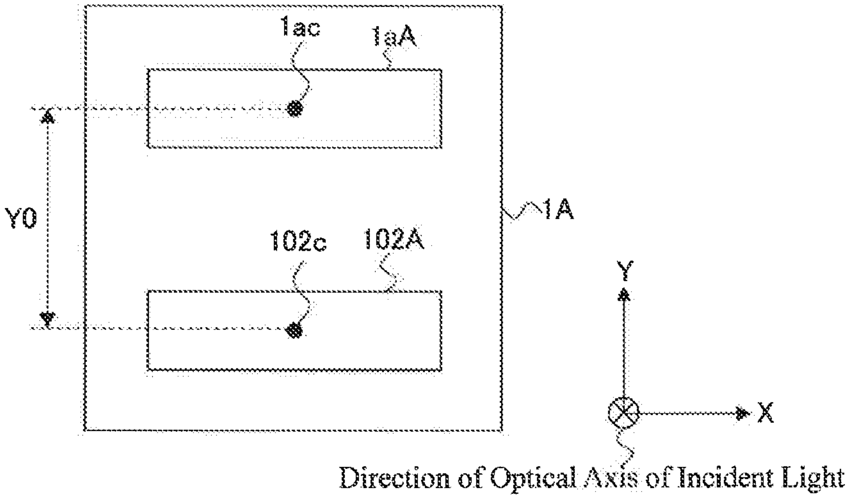
FIG. 16 shows an example arrangement of the light receiving surface 102A of the imaging capture section 102 and the light receiving surface laA of the photodetector 1*a;*

FIG. 16 shows an example arrangement of the light receiving surface 102A of the imaging capture section 102 and the light receiving surface 1*a*A of the photodetector 1*a*. The distance Y0 between the center 102*c*, which is the centroid of the light receiving surface 102A, and the center 1*a*c, which is the centroid of the light receiving surface 1*a*A, is the misalignment between the photodetector 1*a* and the imaging capture section 102. It is noted that the light receiving surface 102A and the light receiving surface 1*a*A are in plane with the surface 1A of the optical texting apparatus 1. The light receiving surface 102A and the light receiving surface 1*a*A each have a rectangular shape.

It is noted that in FIG. 16, the direction perpendicular to the surface of the paper coincides with the direction of the optical axis of incident light, and the X axis (horizontal direction) and the Y axis (vertical direction) are set orthogonal to the direction of the optical axis of the incident light. The photodetector 1*a* and the imaging capture section 102 are misaligned by Y0 in the Y-axis direction.

Figure 17A:
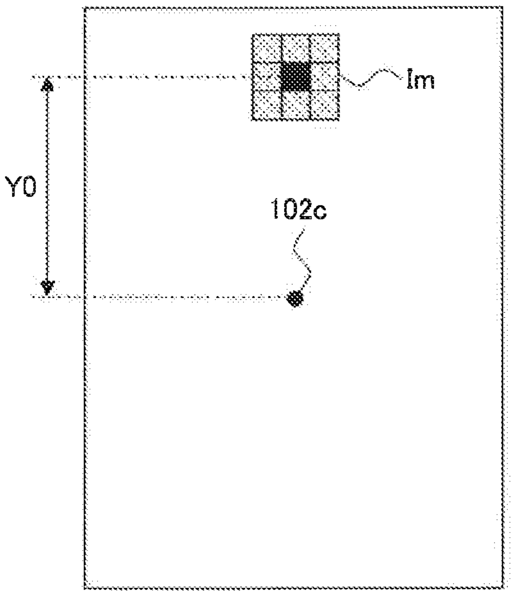
FIGS. 17 (*a*) and 17 (*b*) show an imaging result Im with the imaging capture section 102 in the case where the optical axis of incident light runs through the center lac of the photodetector 1*a* (FIG. 17 (*a*)) and an imaging result Im with the imaging capture section 102 in the case where the optical axis of incident light does not run through the center lac of the photodetector 1*a* (FIG. 17 (*b*))
Figure 17B:
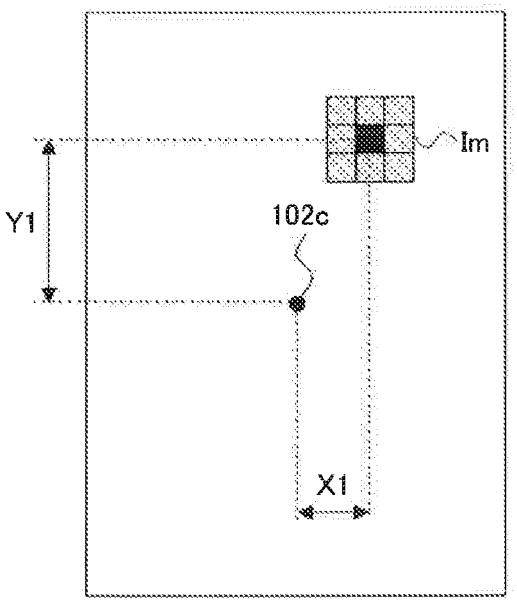

FIG. 17 shows an imaging result 1*m* with the imaging capture section 102 in the case where the optical axis of incident light runs through the center 1*ac* of the photodetector 1*a* (FIG. 17 (*a*)) and an imaging result 1*m* with the imaging capture section 102 in the case where the optical axis of incident light does not run through the center 1*ac* of the photodetector 1*a* (FIG. 17 (*b*)).

Referring to FIG. 17 (*a*), in the case where the optical axis of incident light runs through the center 1*ac* of the photodetector 1*a*, the imaging result 1*m* with the imaging capture section 102 is misaligned with respect to the center 102*c* by Y0 in the Y-axis direction. In this case, the misalignment between the photodetector 1*a* and the imaging capture section 102 is 0 in the X-axis direction and also 0 (=Y0−Y0) in the Y-axis direction.

Referring to FIG. 17 (*b*), in the case where the optical axis of incident light does not run through the center 1*ac* of the photodetector 1*a*, the imaging result 1*m* with the imaging capture section 102 is misaligned with respect to the center 102*c* by, for example, X1 in the X-axis direction and Y1 in the Y-axis direction. In this case, the misalignment between the photodetector 1*a* and the imaging capture section 102 is X1 in the X-axis direction and Y1−Y0 in the Y-axis direction.

The optical axis misalignment deriving section 104 is thus arranged to derive misalignment of the optical axis of incident light with respect to the photodetector 1*a* based on misalignment Y0 between the photodetector 1*a* and the imaging capture section 102 as well as an imaging result 1*m* with the imaging capture section 102.

Misalignment of the optical axis is provided from the optical axis misalignment deriving section 104 to the instrument moving section 3 that is arranged to move the optical measuring instrument 2.

The instrument moving section 3 is arranged to move the optical measuring instrument 2 such that the misalignment of the optical axis of incident light is removed. For example, if the light receiving surface 102A and the light receiving surface 1*a*A are misaligned, as shown in FIG. 16, the instrument moving section 3 moves the optical measuring instrument 2 in an XY plane orthogonal to the optical axis of the incident light (see FIG. 16).

Figure 18:
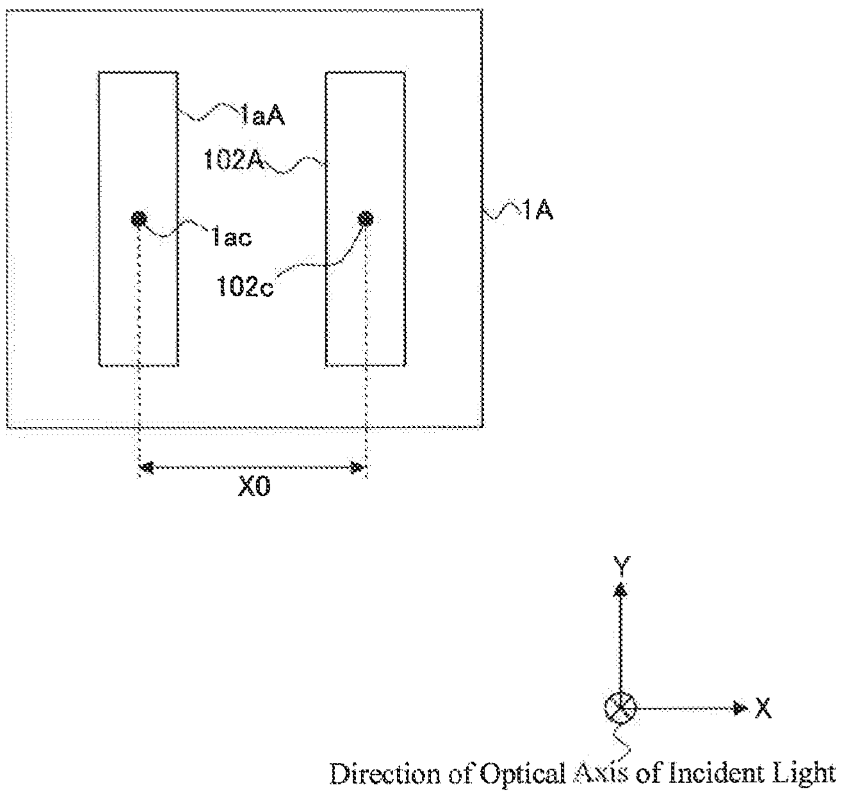
FIG. 18 shows another example arrangement of the light receiving surface 102A of the imaging capture section 102 and the light receiving surface laA of the photodetector 1*a;*

It is noted that in FIG. 16, the light receiving surface 102A and the light receiving surface 1*a*A are misaligned in the Y-axis direction (vertical direction), but may be misaligned in the X-axis direction (horizontal direction). FIG. 18 shows another example arrangement of the light receiving surface 102A of the imaging capture section 102 and the light receiving surface 1*a*A of the photodetector 1*a*. In FIG. 18, the photodetector 1*a* and the imaging capture section 102 are misaligned by X0 in the X-axis direction.

Alternatively, the light receiving surface 102A and the light receiving surface 1*a*A may be misaligned in the θ direction (rotational direction around the rotational axis R orthogonal to the optical axis of the incident light).

Figure 19:
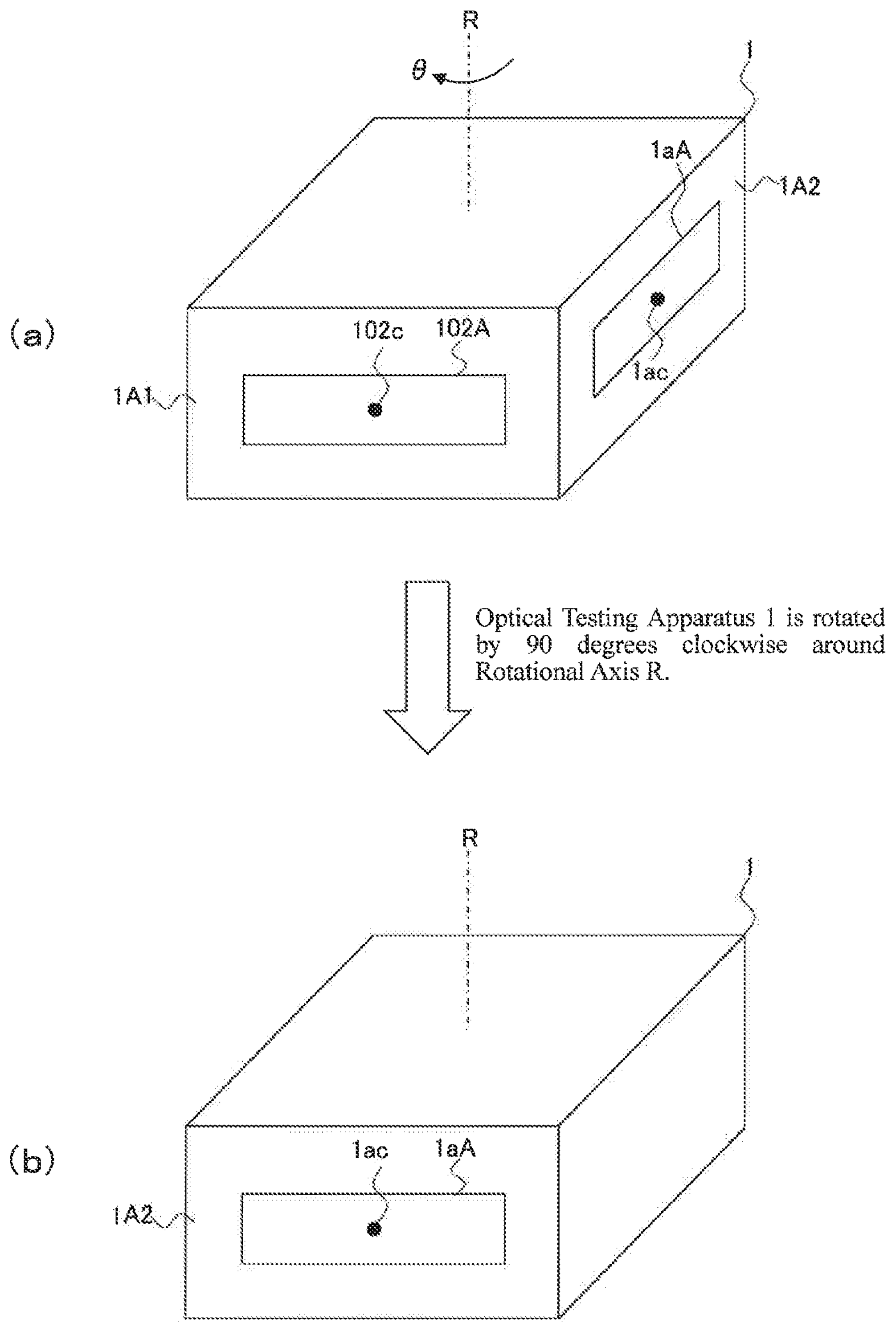
FIG. 19 shows an example arrangement in the case where the light receiving surface 102A of the imaging capture section 102 and the light receiving surface laA of the photodetector 1*a* are misaligned in the 0 direction and a method for optical axis alignment.
Figure 20:
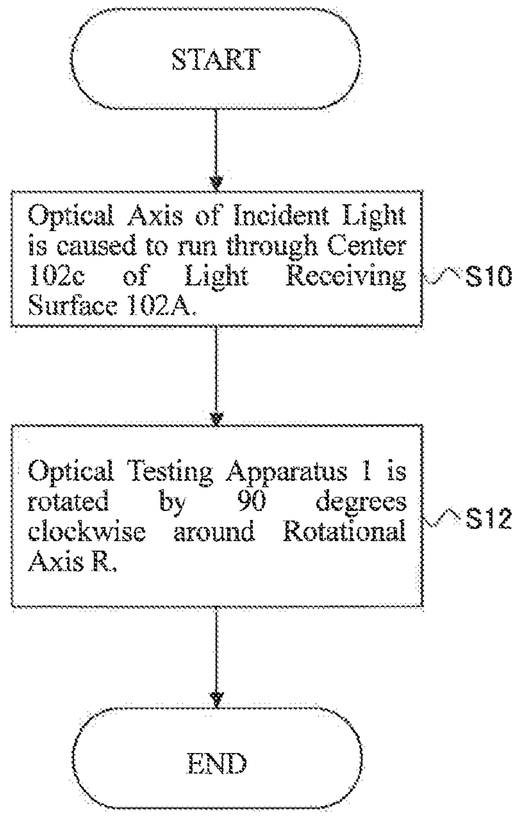
FIG. 20 is a flowchart illustrating a procedure of the method for optical axis alignment.

FIG. 19 shows an example arrangement in the case where the light receiving surface 102A of the imaging capture section 102 and the light receiving surface 1*a*A of the photodetector 1*a* are misaligned in the θ direction and a method for optical axis alignment. FIG. 20 is a flowchart illustrating a procedure of the method for optical axis alignment.

Referring to FIG. 19 (*a*), the light receiving surface 102A of the imaging capture section 102 is arranged in a surface 1A1 of the optical testing apparatus 1 and the light receiving surface 1*a*A of the photodetector 1*a* is arranged in a surface 1A2 of the optical testing apparatus 1. The surface 1A1 and the surface 1A2 are orthogonal to each other. The rotational axis R is orthogonal to the bottom surface of the optical testing apparatus 1, which is orthogonal to the surface 1A1 and the surface 1A2, and runs through the centroid of the bottom surface. It is noted that the rotational axis R is orthogonal to the optical axis of incident light. The light receiving surface 102A and the light receiving surface 1*a*A are misaligned by 90 degrees around the rotational axis R.

First, the optical axis of incident light is caused to run through the center 102*c* of the light receiving surface 102A (S10 in FIG. 20). Upon this, the optical axis of the incident light runs through the center 102*c* orthogonally to the light receiving surface 102A. The instrument moving section 3 then rotates the optical testing apparatus 1 by 90 degrees clockwise around the rotational axis R (S12 in FIG. 20). Referring to FIG. 19 (*b*), this causes the center lac to be placed at the position where the center 102*c* existed (see FIG. 19 (*a*)). This in turn causes the optical axis of the incident light to run through the center 1*ac* of the light receiving surface 1*a*A of the photodetector 1*a*. Upon this, the optical axis of the incident light runs through the center 1*ac* orthogonally to the light receiving surface 1*a*A.

Next will be described an operation according to the first embodiment.

Figure 21:
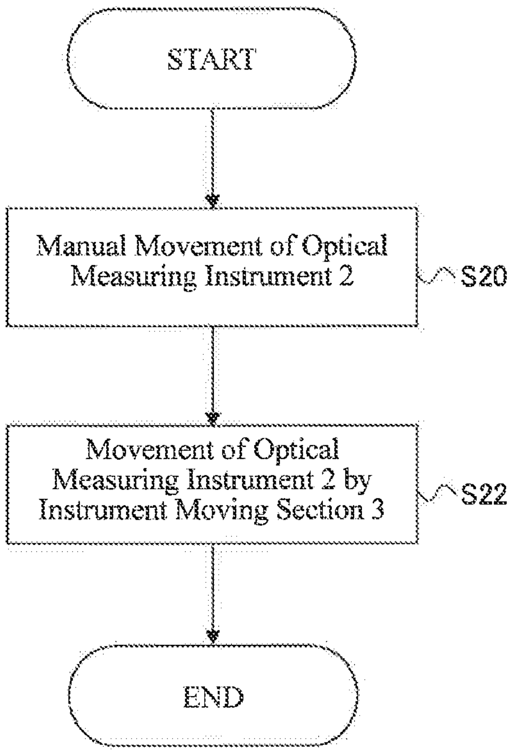
FIG. 21 is a flowchart illustrating a procedure for removing misalignment between the photodetector 1*a* and the optical axis of incident light.

FIG. 21 is a flowchart illustrating a procedure for removing misalignment between the photodetector 1*a* and the optical axis of incident light.

In order to test whether or not the optical measuring instrument 2 can accurately measure the distance D1, the optical testing apparatus 1 is first disposed between the optical measuring instrument 2 and the incident object 4 (see FIG. 1 (*b*)).

The optical measuring instrument 2 is then moved manually to roughly align the optical detector 1*a* and the optical axis of the incident light (S20 in FIG. 21). The instrument moving section 3 is further caused to move the optical measuring instrument 2 (S22 in FIG. 21) to remove the misalignment of the optical axis of the incident light with respect to the photodetector 1*a*. That is, the optical measuring instrument 2 is moved manually before the instrument moving section 3 moves the optical measuring instrument 2. Note that the manual movement of the optical measuring instrument 2 (S20) may be omitted so that the movement of the optical measuring instrument 2 by the instrument moving section 3 (S22) may only be achieved.

Incident light from the light source 2*a* of the optical measuring instrument 2 is provided to the photodetector 1*a* of the optical testing apparatus 1. The incident light is converted through the photodetector 1*a* into an electrical signal and provided to the variable delay element 1*b*. The electrical signal is delayed by a delay time approximately equal to 2×D1/c (e.g. 2×D1/c or 2×(D1−D2)/c) and provided to the laser diode 1*c*. The output from the variable delay element 1*b* is converted through the laser diode 1*c* into a light signal. The light signal passes through the lens 1*d*, the optical attenuator 1*e*, and the Galvano mirror 1*f* to be provided to approximately the center of the incident object 4. The light signal is reflected at the incident object 4 to be a reflected light signal.

The optical path of the reflected light signal is redirected by the Galvano mirror 1g toward the light receiving section 2*b*. The reflected light signal passes through the Galvano mirror 1g to be provided to the light receiving section 2*b* of the optical measuring instrument 2.

In accordance with the first embodiment, after a predetermined delay time since the photodetector (incident light receiving section) 1*a* has received incident light (approximately equal to the time between emission of the incident light from the light source 2*a* and reception of reflected light by the optical measuring instrument 2 in the case of actually using the optical measuring instrument 2 (see FIG. 1 (*a*))) (e.g. 2×D1/c or 2×(D1−D2)/c), the laser diode (light signal providing section) 1*c* provides a light signal to the incident object 4. This allows the distance D2 between the optical measuring instrument 2 and the incident object 4 in testing the optical measuring instrument 2 (see FIG. 1 (*b*)) to be smaller than in a situation where the optical measuring instrument 2 is expected to be used (distance D1; see FIG. 1 (*a*)), which can prevent the distance D2 from increasing.

If the optical testing apparatus 1 is not disposed and the optical measuring instrument 2 and the incident object 4 are disposed with being spaced away from each other by the distance D2, the time between emission of incident light from the light source 2*a* and reception of reflected light by the optical measuring instrument 2 is 2×D2/c (approximately zero). The measurement result of the distance between the optical measuring instrument 2 and the incident object 4 is therefore D2. This cannot test whether or not the optical measuring instrument 2 can accurately measure the distance D1.

However, the optical testing apparatus 1, if disposed between the optical measuring instrument 2 and the incident object 4 (see FIG. 1 (*b*)), causes delay therein by a delay time approximately equal to 2×D1/c. This causes the time Δt between emission of incident light from the light source 2*a* and reception of reflected light by the optical measuring instrument 2 to be approximately equal to 2×D1/c. For example, if the delay time is 2×D1/c, Δt=2×D1/c+2×D2/c, where D2 is much smaller than D1 and thereby 2×D2/c can be ignored, resulting in Δt=2×D1/c. On the other hand, if the delay time is 2×(D1−D2)/c, Δt=2×(D1−D2)/c+2×D2/c=2×D1/c. Whichever the case, since Δt=2×D1/c shows that the measurement result of the distance between the optical measuring instrument 2 and the incident object 4 is D1, it is possible to test whether or not the optical measuring instrument 2 can accurately measure the distance D1.

Moreover, in accordance with the first embodiment, it is possible to remove the misalignment of the optical axis of incident light with respect to the photodetector 1*a*.

It is noted that the optical testing apparatus 1 according to the first embodiment can have the following variations.

First Variation

Figure 3:
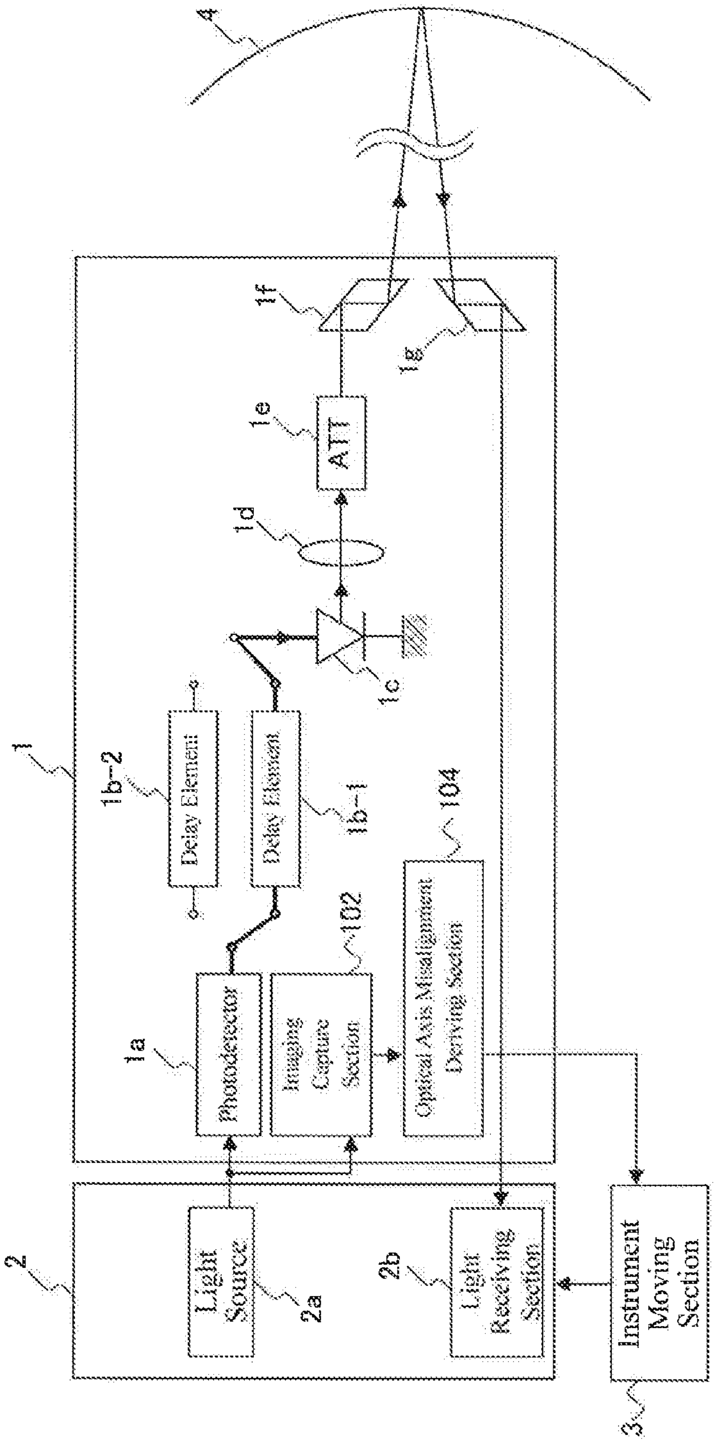
FIG. 3 is a functional block diagram showing the configuration of an optical testing apparatus 1 according to a first variation of the first embodiment of the present invention.

FIG. 3 is a functional block diagram showing the configuration of an optical testing apparatus 1 according to a first variation of the first embodiment of the present invention.

The optical testing apparatus 1 according to the first variation of the first embodiment of the present invention includes delay elements 1*b*-1, 1*b*-2 in place of the variable delay element 1*b* according to the first embodiment.

The delay elements 1*b*-1, 1*b*-2 have their respective different delay times (provided that the delay times are not variable but constant), one of which is to be selected and used. In the example of FIG. 3, the delay element 1*b*-1 is selected and used. The example of FIG. 3 can support the case where there are two distances D1 in the case of actually using the optical measuring instrument 2.

It is noted that in the optical testing apparatus 1 according to the first variation, the number of delay elements is not limited to two, but may be three or more. Note that a driver circuit (not shown) may be connected to the input of the laser diode 1*c* to provide an output from the delay element 1*b*-1 or 1*b*-2 to the laser diode 1*c* via the driver circuit.

In this case, the driver circuit amplifies and provides an output current from the delay element 1*b*-1 or 1*b*-2 to the laser diode 1*c* as a current high enough to drive the laser diode 1*c*. Even in this case, the laser diode 1*c* remains to convert an output from the delay element 1*b*-1 or 1*b*-2 into a light signal (the same applies to the variations of the second and third embodiments).

Second Variation

Figure 4A:
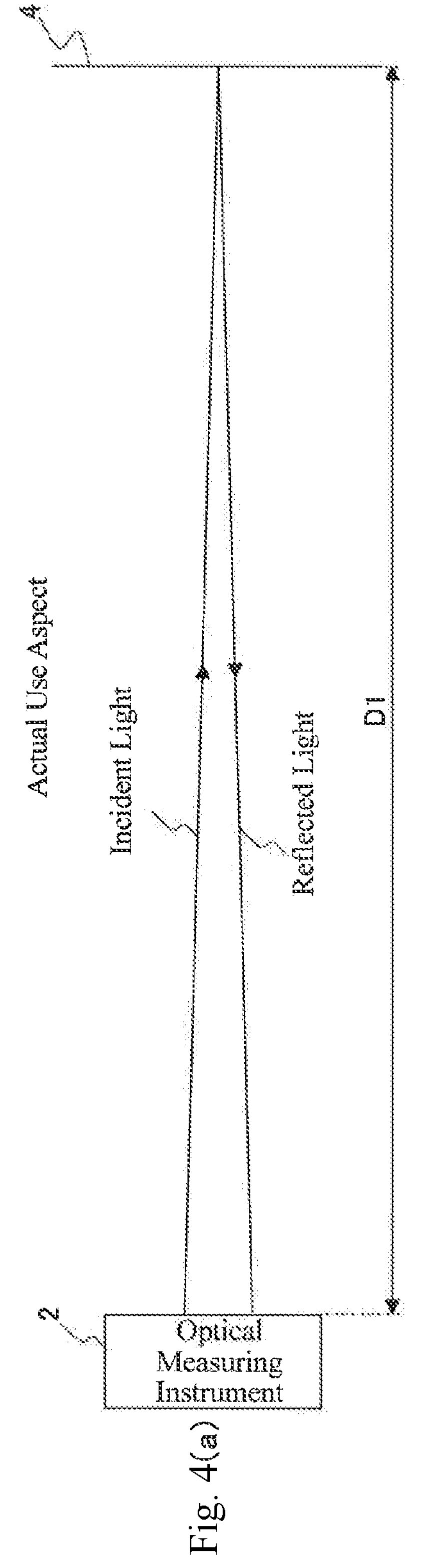
FIGS. 4 (*a*) and 4 (*b*) show an actual use aspect (FIG. 4 (*a*)) and a testing use aspect (FIG. 4 (*b*)) of an optical measuring instrument 2 according to a second variation of the first embodiment of the present invention.
Figure 4B:
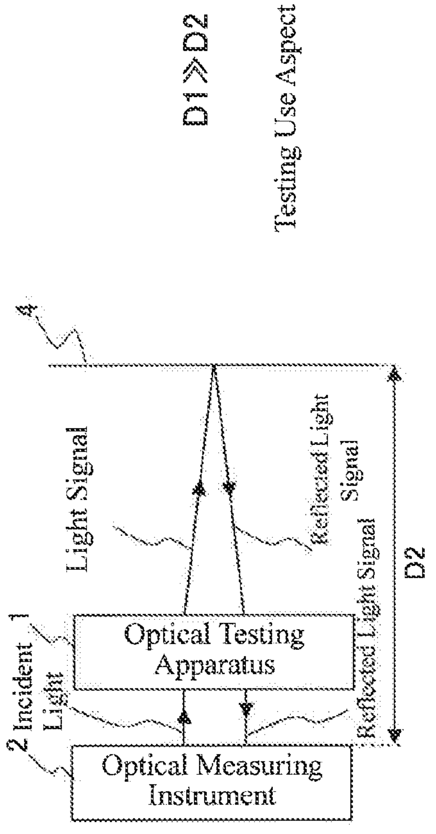

FIG. 4 shows an actual use aspect (FIG. 4 (*a*)) and a testing use aspect (FIG. 4 (*b*)) of an optical measuring instrument 2 according to a second variation of the first embodiment of the present invention. It is noted that the instrument moving section 3 (see FIG. 2) is not shown as in FIG. 1.

The optical testing apparatus 1 according to the second variation of the first embodiment of the present invention differs from that of the first embodiment in that the incident object 4 is a flat plate. It is noted that the incident object 4 according to the second variation may have a variable reflectance. For example, employing liquid crystal as the incident object 4 and changing colors provides reflectance variability.

It is noted that variations similar to the second variation will be contemplated in the fourth and seventh embodiments.

Second Embodiment

The optical testing apparatus 1 according to a second embodiment differs from that of the first embodiment in that a coupler (light traveling direction changing section) is used in place of the incident object 4.

The actual use aspect and the testing use aspect of the optical measuring instrument 2 according to the second embodiment are the same as those of the first embodiment and will not be described (see FIG. 1; note that the coupler 5 is used in place of the incident object 4). Note that the coupler 5 should be included in the optical testing apparatus 1 (see FIG. 5).

Figure 5:
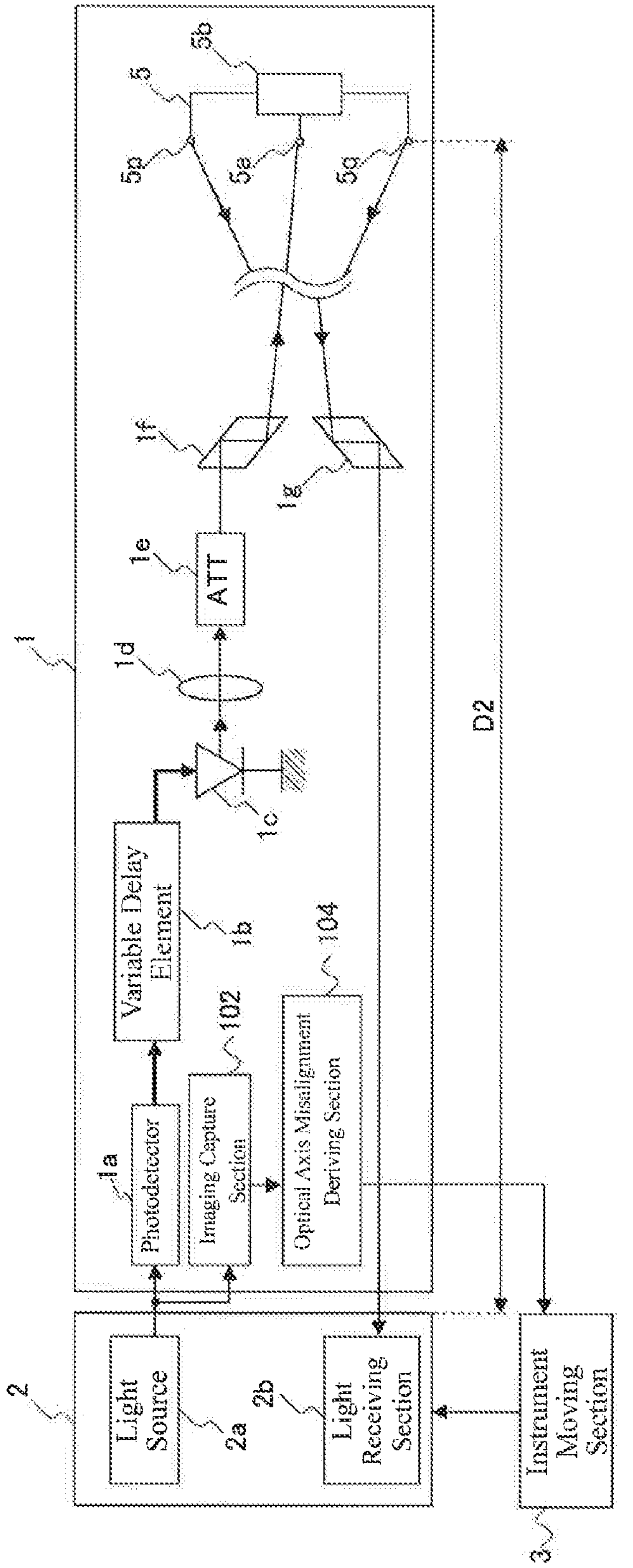
FIG. 5 is a functional block diagram showing the configuration of an optical testing apparatus 1 according to the second embodiment of the present invention.

FIG. 5 is a functional block diagram showing the configuration of an optical testing apparatus 1 according to the second embodiment of the present invention. The optical testing apparatus 1 according to the second embodiment includes a photodetector (incident light receiving section) 1*a*, a variable delay element (electrical signal delay section) 1*b*, a laser diode (light signal providing section) 1*c*, a lens 1*d*, an optical attenuator 1*e*, Galvano mirrors 1*f*, 1*g*, an imaging capture section 102, an optical axis misalignment deriving section 104, and a coupler (light traveling direction changing section) 5. The coupler 5 has an input end 5*a*, a branch section 5*b*, and output ends 5*p*, 5*q*. Components identical to those in the first embodiment will be designated by the same symbols to omit the description thereof.

The photodetector (incident light receiving section) 1*a*, the variable delay element (electrical signal delay section) 1*b*, the lens 1*d*, the optical attenuator 1*e*, the imaging capture section 102, and the optical axis misalignment deriving section 104 are the same as those in the first embodiment and will not be described.

The laser diode (light signal providing section) 1*c* is approximately the same as that in the first embodiment, except that it outputs and provides a light signal to the coupler 5.

The Galvano mirror if is approximately the same as that in the first embodiment, except that it provides a light signal to the input end 5*a* of the coupler 5. The light signal is branched through the branch section 5*b* into two or more emission light beams, which are then output at the respective output ends 5*p*, Sq. Light beams output from the output ends 5*p*, 5*q* are called direction changed light signal. A direction changed light signal is a result of a change in the traveling direction of a light signal through the coupler 5 and arranged to be emitted from the coupler 5 toward the optical measuring instrument 2.

The Galvano mirror 1*g* is arranged to redirect the optical path of a direction changed light signal toward the light receiving section 2*b* of the optical measuring instrument 2 and then provide the direction changed light signal therethrough to the light receiving section 2*b*.

It is noted that the distance between the Galvano mirror 1*g* and the output ends 5*p*, 5*q* is large enough to approximately equate the line segment between the Galvano mirror 1*g* and the output end 5*p* with the line segment between the Galvano mirror 1*g* and the output end 5*q*. Accordingly, the optical path of a direction changed light signal output from the output end 5*p* can be equated with the optical path of a direction changed light signal output from the output end 5*q* in the vicinity of the Galvano mirror 1*g*.

Next will be described an operation according to the second embodiment.

In order to test whether or not the optical measuring instrument 2 can accurately measure the distance D1, the optical testing apparatus 1 having the coupler 5 is first disposed in front of the optical measuring instrument 2.

The optical measuring instrument 2 is then moved manually to roughly align the optical detector 1*a* and the optical axis of the incident light (S20 in FIG. 21). The instrument moving section 3 is further caused to move the optical measuring instrument 2 (S22 in FIG. 21) to remove the misalignment of the optical axis of the incident light with respect to the photodetector 1*a*. That is, the optical measuring instrument 2 is moved manually before the instrument moving section 3 moves the optical measuring instrument2. Note that the manual movement of the optical measuring instrument 2 (S20) may be omitted so that the movement of the optical measuring instrument 2 by the instrument moving section 3 (S22) may only be achieved.

Incident light from the light source 2*a* of the optical measuring instrument 2 is provided to the photodetector 1*a* of the optical testing apparatus 1. The incident light is converted through the photodetector 1*a* into an electrical signal and provided to the variable delay element 1*b*. The electrical signal is delayed by a delay time approximately equal to 2×D1/c (e.g. 2×D1/c or 2×(D1−D2)/c) and provided to the laser diode 1*c*. The output from the variable delay element 1*b* is converted through the laser diode 1*c* into a light signal. The light signal passes through the lens 1*d*, the optical attenuator 1*e*, and the Galvano mirror if to be provided to the input end 5*a* of the coupler 5. The light signal changes its traveling direction through the coupler 5 to be a direction changed light signal and then emitted from the output ends 5*p*, 5*q* toward the optical measuring instrument 2.

The optical path of the direction changed light signal is redirected by the Galvano mirror 1*g* toward the light receiving section 2*b*. The direction changed light signal passes through the Galvano mirror 1*g* to be provided to the light receiving section 2*b* of the optical measuring instrument 2.

The second embodiment exhibits the same advantageous effects as the first embodiment. That is, the distance D2 between the optical measuring instrument 2 and the coupler 5 (in place of the incident object 4) in testing the optical measuring instrument 2 (see FIG. 5; note that the distance D2 has the same length as in the first embodiment) to be smaller than in a situation where the optical measuring instrument 2 is expected to be used (distance D1; see FIG. 1 (*a*)), which can prevent the distance D2 from increasing. Moreover, it is possible to remove the misalignment of the optical axis of incident light with respect to the photodetector 1*a*.

It is noted that the optical testing apparatus 1 according to the second embodiment can have the following variation.

Figure 6:
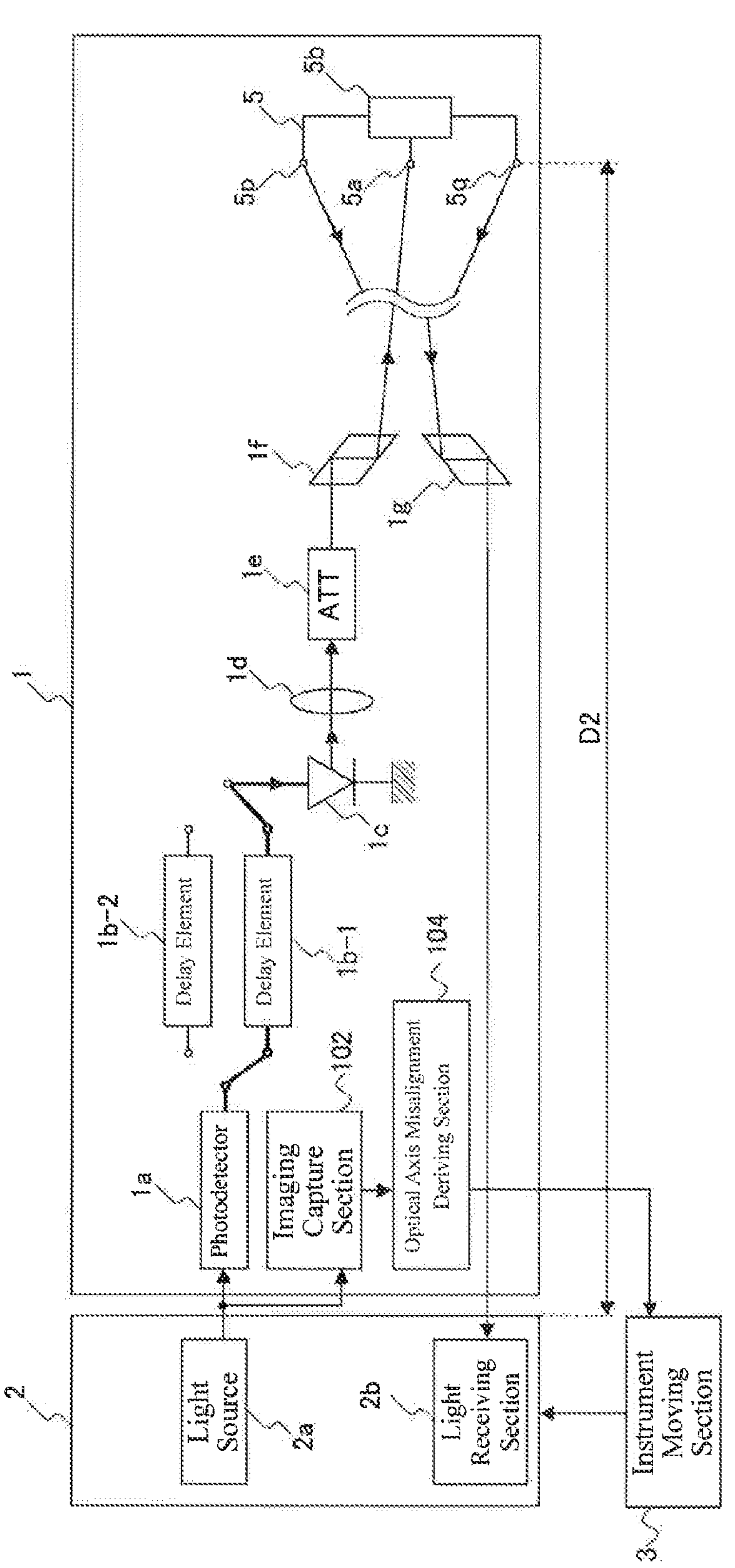
FIG. 6 is a functional block diagram showing the configuration of an optical testing apparatus 1 according to a variation of the second embodiment of the present invention.

FIG. 6 is a functional block diagram showing the configuration of an optical testing apparatus 1 according to a variation of the second embodiment of the present invention.

The optical testing apparatus 1 according to the variation of the second embodiment of the present invention includes delay elements 1*b*-1, 1*b*-2 in place of the variable delay element 1*b* according to the second embodiment.

The delay elements 1*b*-1, 1*b*-2 have their respective different delay times (provided that the delay times are not variable but constant), one of which is to be selected and used. In the example of FIG. 6, the delay element 1*b*-1 is selected and used. The example of FIG. 6 can support the case where there are two distances D1 in the case of actually using the optical measuring instrument 2.

It is noted that in the optical testing apparatus 1 according to the variation above, the number of delay elements is not limited to two, but may be three or more.

Third Embodiment

The optical testing apparatus 1 according to a third embodiment differs from that of the first embodiment in that the incident object 4 is not used.

The actual use aspect of the optical measuring instrument 2 according to the third embodiment is the same as that of the first embodiment and will not be described (see FIG. 1 (*a*)). In the testing use aspect of the optical measuring instrument 2 according to the third embodiment, the optical measuring instrument 2 and the optical testing apparatus 1 are used, while neither the incident object 4 nor the coupler 5 is used (see FIG. 7).

Figure 7:
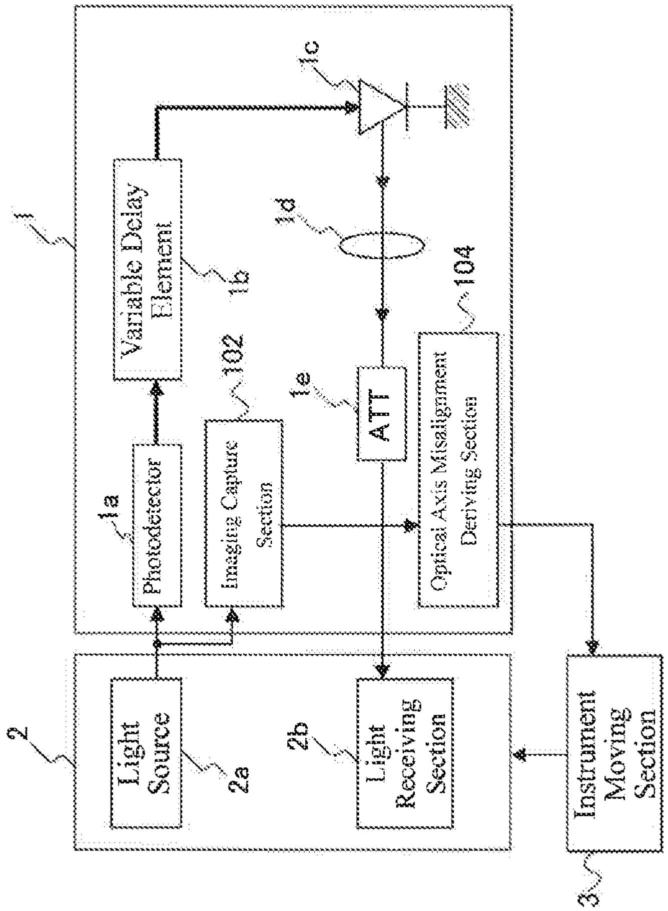
FIG. 7 is a functional block diagram showing the configuration of the optical testing apparatus 1 according to the third embodiment of the present invention.

FIG. 7 is a functional block diagram showing the configuration of the optical testing apparatus 1 according to the third embodiment of the present invention. Referring to FIG. 7, the optical testing apparatus 1 according to the third embodiment includes a photodetector (incident light receiving section) 1*a*, a variable delay element (electrical signal delay section) 1*b*, a laser diode (light signal providing section) 1*c*, a lens 1*d*, an optical attenuator 1*e*, an imaging capture section 102, and an optical axis misalignment deriving section 104.

The photodetector (incident light receiving section) 1*a*, the variable delay element (electrical signal delay section) 1*b*, the lens 1*d*, the imaging capture section 102, and the optical axis misalignment deriving section 104 are the same as those in the first embodiment and will not be described.

The laser diode (light signal providing section) 1*c* is approximately the same as that in the first embodiment, except that it outputs and provides a light signal to the optical measuring instrument 2.

The optical attenuator 1*e* is approximately the same as that in the first embodiment, except that it provides a light signal to the light receiving section 2*b* of the optical measuring instrument 2.

Next will be described an operation according to the third embodiment.

In order to test whether or not the optical measuring instrument 2 can accurately measure the distance D1, the optical testing apparatus 1 is first disposed in front of the optical measuring instrument 2.

The optical measuring instrument 2 is then moved manually to roughly align the optical detector 1*a* and the optical axis of the incident light (S20 in FIG. 21). The instrument moving section 3 is further caused to move the optical measuring instrument 2 (S22 in FIG. 21) to remove the misalignment of the optical axis of the incident light with respect to the photodetector 1*a*. That is, the optical measuring instrument 2 is moved manually before the instrument moving section 3 moves the optical measuring instrument2. Note that the manual movement of the optical measuring instrument 2 (S20) may be omitted so that the movement of the optical measuring instrument 2 by the instrument moving section 3 (S22) may only be achieved.

Incident light from the light source 2*a* of the optical measuring instrument 2 is provided to the photodetector 1*a* of the optical testing apparatus 1. The incident light is converted through the photodetector 1*a* into an electrical signal and provided to the variable delay element 1*b*. The electrical signal is delayed by a delay time approximately equal to 2×D1/c and provided to the laser diode 1*c*. The output from the variable delay element 1*b* is converted through the laser diode 1*c* into a light signal. The light signal passes through the lens 1*d* and the optical attenuator 1*e* to be provided to the light receiving section 2*b* of the optical measuring instrument 2.

The third embodiment exhibits the same advantageous effects as the first embodiment. That is, since neither the incident object 4 nor the coupler 5 (in place of the incident object 4) is used in testing the optical measuring instrument 2, the distance D2 cannot exist between the optical measuring instrument 2 and the incident object 4 (or an alternative thereto), which can prevent the distance D2 from increasing. Moreover, it is possible to remove the misalignment of the optical axis of incident light with respect to the photodetector 1*a*.

It is noted that the optical testing apparatus 1 according to the third embodiment can have the following variation.

Figure 8:
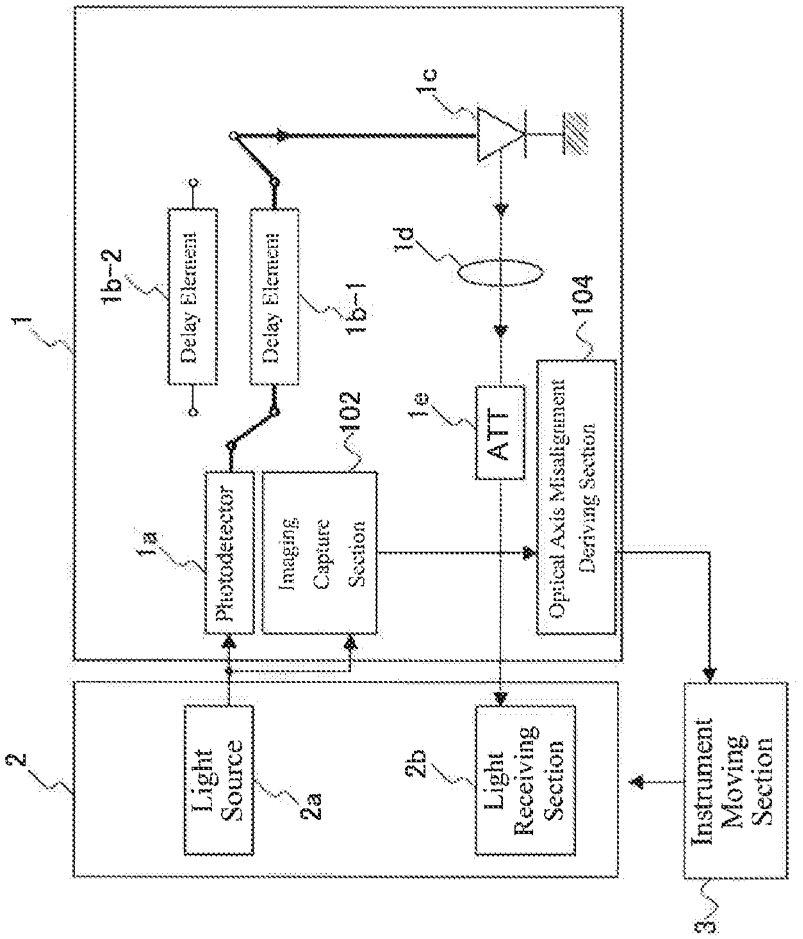
FIG. 8 is a functional block diagram showing the configuration of an optical testing apparatus 1 according to a variation of the third embodiment of the present invention.

FIG. 8 is a functional block diagram showing the configuration of an optical testing apparatus 1 according to a variation of the third embodiment of the present invention.

The optical testing apparatus 1 according to the variation of the third embodiment of the present invention includes delay elements 1*b*-1, 1*b*-2 in place of the variable delay element 1*b* according to the third embodiment.

The delay elements 1*b*-1, 1*b*-2 have their respective different delay times (provided that the delay times are not variable but constant), one of which is to be selected and used. In the example of FIG. 8, the delay element 1*b*-1 is selected and used. The example of FIG. 8 can support the case where there are two distances D1 in the case of actually using the optical measuring instrument 2.

It is noted that in the optical testing apparatus 1 according to the variation above, the number of delay elements is not limited to two, but may be three or more.

Fourth Embodiment

The optical testing apparatus 1 according to a fourth embodiment differs from that of the first embodiment in that an IC 1*i* is used.

The actual use aspect and the testing use aspect of the optical measuring instrument 2 according to the fourth embodiment are the same as those of the first embodiment and will not be described (see FIG. 1).

Figure 9:
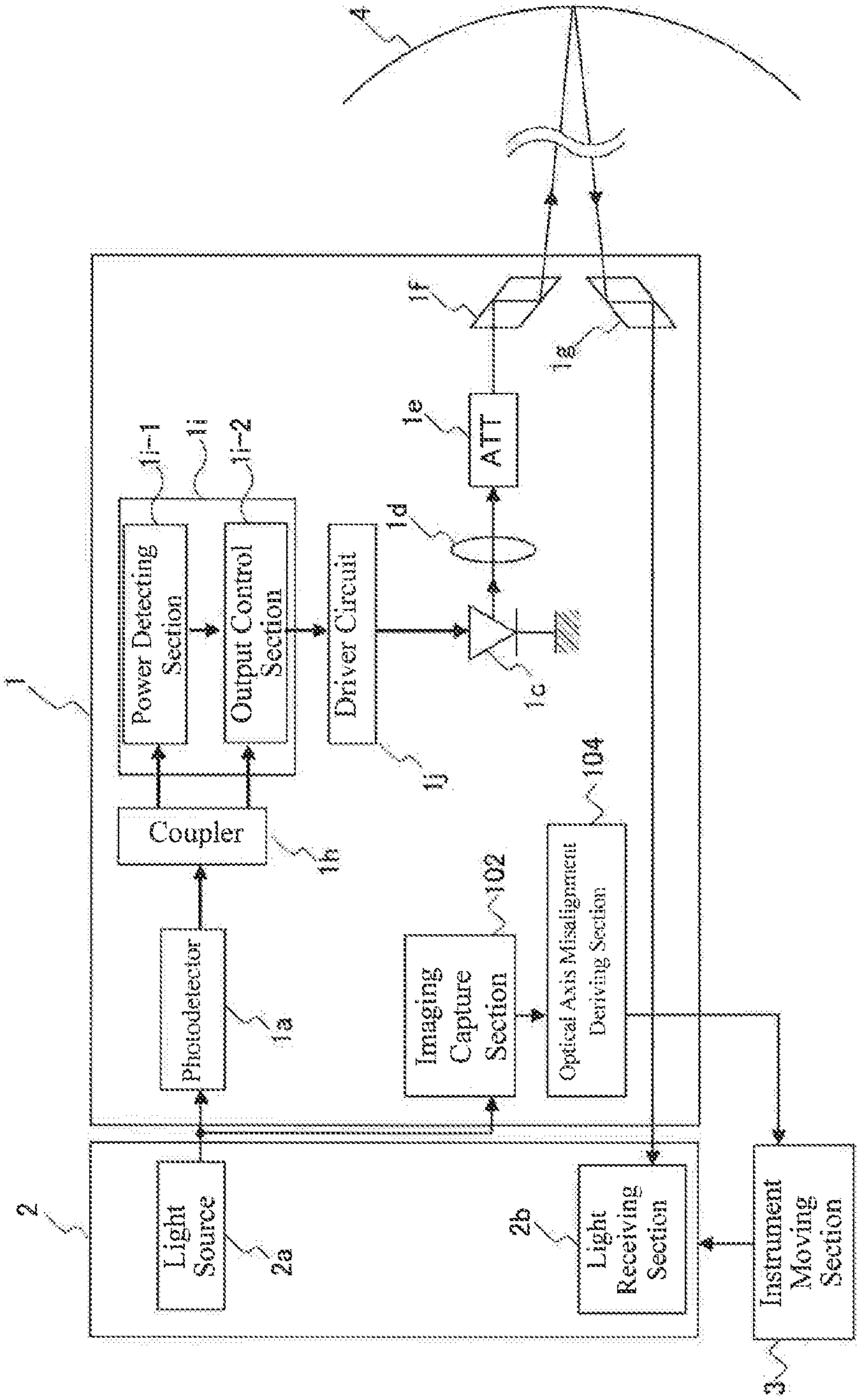
FIG. 9 is a functional block diagram showing the configuration of the optical testing apparatus 1 according to the fourth embodiment of the present invention.

FIG. 9 is a functional block diagram showing the configuration of the optical testing apparatus 1 according to the fourth embodiment of the present invention. The optical testing apparatus 1 according to the fourth embodiment includes a photodetector (incident light receiving section) 1*a*, a laser diode (light signal providing section) 1*c*, a lens 1*d*, an optical attenuator 1*e*, Galvano mirrors 1*f*, 1*g*, a coupler 1*l*, an IC 1*i*, a driver circuit 1*j*, an imaging capture section 102, and an optical axis misalignment deriving section 104. Components identical to those in the first embodiment will be designated by the same symbols to omit the description thereof.

The photodetector (incident light receiving section) 1*a*, the lens 1*d*, the optical attenuator 1*e*, the Galvano mirrors 1*f*, 1*g*, the imaging capture section 102, and the optical axis misalignment deriving section 104 are the same as those in the first embodiment and will not be described.

The coupler 1*h* is arranged to branch an electrical signal output from the photodetector 1*a* into two signals and provide them to a power detecting section 1*i*-1 and an output control section 1*i*-2 of the IC 1*i*.

The IC 1*i* is an integrated circuit having the power detecting section 1*i*-1 and the output control section 1*i*-2.

The power detecting section 1*i*-1 is arranged to receive an electrical signal and determine whether or not the power of incident light is within a predetermined range. The power detecting section 1*i*-1 is arranged to activate the output control section 1*i*-2 if the power of incident light is within the predetermined range. The output control section 1*i*-2 is arranged to receive an electrical signal and activate the driver circuit 1*j* after a predetermined delay time (as in the first embodiment).

The driver circuit 1*j* is arranged to activate the laser diode 1*c*.

The laser diode (light signal providing section) 1*c* is arranged to output a light signal (e.g. a laser beam).

It is noted that both the time between reception of incident light by the photodetector (incident light receiving section) 1*a* and activation of the output control section 1*i*-2 and the time between activation of the driver circuit 1*j* and output of a light signal from the laser diode 1*c* are approximately zero. The output control section 1*i*-2 thus causes, based on an electrical signal, the laser diode (light signal providing section) 1*c* to output a light signal after a predetermined delay time since the photodetector (incident light receiving section) 1*a* has received incident light.

Next will be described an operation according to the fourth embodiment.

In order to test whether or not the optical measuring instrument 2 can accurately measure the distance D1, the optical testing apparatus 1 is first disposed between the optical measuring instrument 2 and the incident object 4 (see FIG. 1 (*b*)).

The optical measuring instrument 2 is then moved manually to roughly align the optical detector 1*a* and the optical axis of the incident light (S20 in FIG. 21). The instrument moving section 3 is further caused to move the optical measuring instrument 2 (S22 in FIG. 21) to remove the misalignment of the optical axis of the incident light with respect to the photodetector 1*a*. That is, the optical measuring instrument 2 is moved manually before the instrument moving section 3 moves the optical measuring instrument2. Note that the manual movement of the optical measuring instrument 2 (S20) may be omitted so that the movement of the optical measuring instrument 2 by the instrument moving section 3 (S22) may only be achieved.

Incident light from the light source 2*a* of the optical measuring instrument 2 is provided to the photodetector 1*a* of the optical testing apparatus 1. The incident light is converted through the photodetector 1*a* into an electrical signal and provided via the coupler 1*h* to the power detecting section 1*i*-1 and the output control section 1*i*-2 of the IC 1*i*.

When the power detecting section 1*i*-1 receives the electrical signal and activates the output control section 1*i*-2, the output control section 1*i*-2 delays the electrical signal by a delay time approximately equal to 2×D1/c (e.g. 2×D1/c or 2×(D1−D2)/c) and provides it to the driver circuit 1*j*. When the driver circuit 1*j* activates the laser diode 1*c*, the laser diode 1*c* outputs a light signal. The light signal passes through the lens 1*d*, the optical attenuator 1*e*, and the Galvano mirror if to be provided to approximately the center of the incident object 4. The light signal is reflected at the incident object 4 to be a reflected light signal.

The optical path of the reflected light signal is redirected by the Galvano mirror 1*g* toward the light receiving section 2*b*. The reflected light signal passes through the Galvano mirror 1*g* to be provided to the light receiving section 2*b* of the optical measuring instrument 2.

The fourth embodiment exhibits the same advantageous effects as the first embodiment.

Fifth Embodiment

The optical testing apparatus 1 according to a fifth embodiment differs from that of the second embodiment in that an IC 1*i* is used.

The actual use aspect and the testing use aspect of the optical measuring instrument 2 according to the fifth embodiment are the same as those of the second embodiment and will not be described (see FIG. 1; note that the coupler 5 is used in place of the incident object 4). Note that the coupler 5 should be included in the optical testing apparatus 1 (see FIG. 10).

Figure 10:
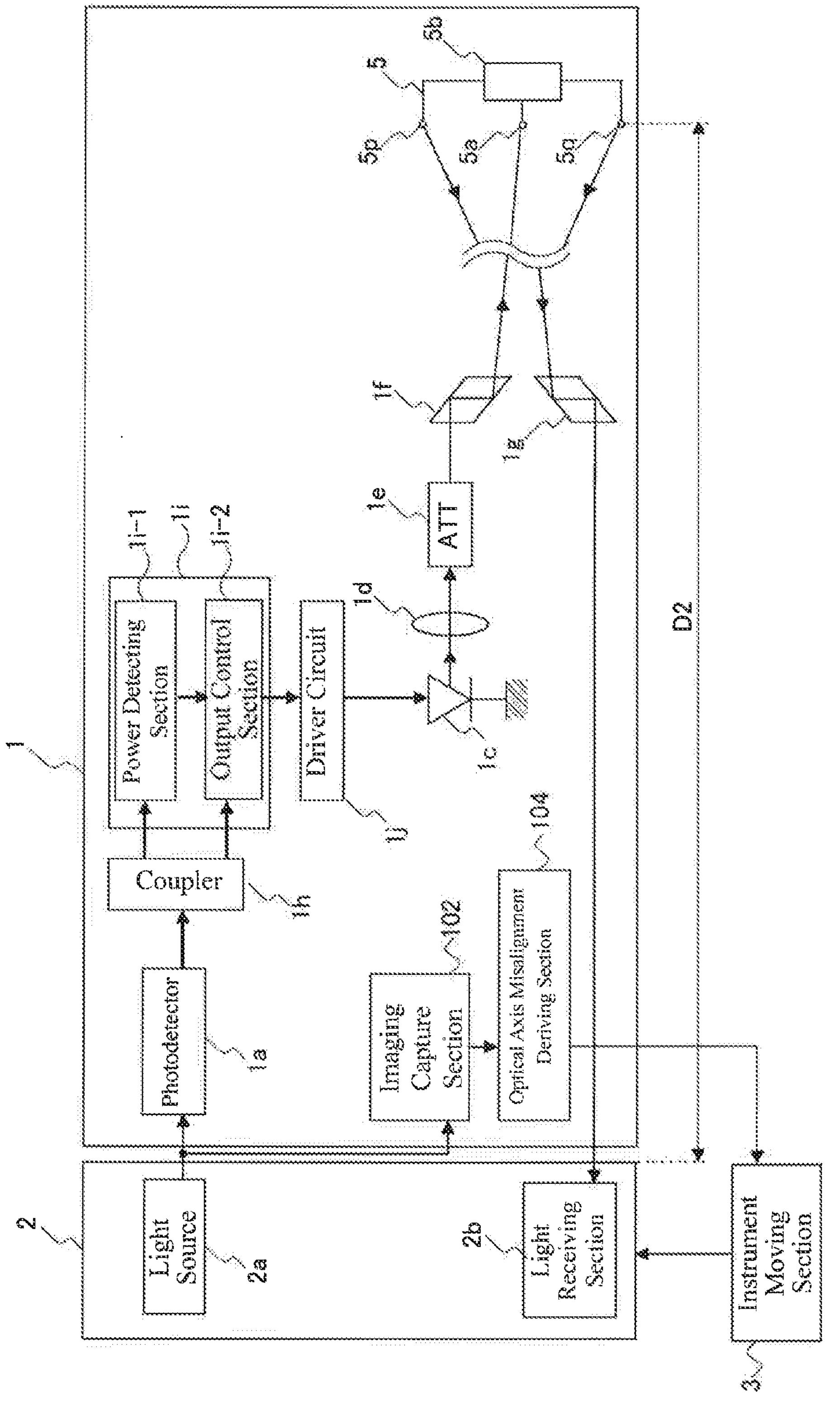
FIG. 10 is a functional block diagram showing the configuration of the optical testing apparatus 1 according to the fifth embodiment of the present invention.

FIG. 10 is a functional block diagram showing the configuration of the optical testing apparatus 1 according to the fifth embodiment of the present invention. The optical testing apparatus 1 according to the fifth embodiment includes a photodetector (incident light receiving section) 1*a*, a laser diode (light signal providing section) 1*c*, a lens 1*d*, an optical attenuator 1*e*, Galvano mirrors 1*f*, 1*g*, a coupler 1*h*, an IC 1*i*, a driver circuit 1*j*, an imaging capture section 102, an optical axis misalignment deriving section 104, and a coupler (light traveling direction changing section) 5. The coupler 5 has an input end 5*a*, a branch section 5*b*, and output ends 5*p*, 5*q*. Components identical to those in the second embodiment will be designated by the same symbols to omit the description thereof.

The photodetector (incident light receiving section) 1*a*, the lens 1*d*, the optical attenuator 1*e*, the Galvano mirrors 1*f*, 1*g*, the imaging capture section 102, the optical axis misalignment deriving section 104, and the coupler 5 are the same as those in the second embodiment and will not be described.

The coupler 1*h* is arranged to branch an electrical signal output from the photodetector 1*a* into two signals and provide them to a power detecting section 1*i*-1 and an output control section 1*i*-2 of the IC 1*i*.

The IC 1*i* is an integrated circuit having the power detecting section 1*i*-1 and the output control section 1*i*-2.

The power detecting section 1*i*-1 is arranged to receive an electrical signal and determine whether or not the power of incident light is within a predetermined range. The power detecting section 1*i*-1 is arranged to activate the output control section 1*i*-2 if the power of incident light is within the predetermined range. The output control section 1*i*-2 is arranged to receive an electrical signal and activate the driver circuit 1*j* after a predetermined delay time (as in the first embodiment).

The driver circuit 1*j* is arranged to activate the laser diode 1*c*.

The laser diode (light signal providing section) 1*c* is arranged to output a light signal (e.g. a laser beam).

It is noted that both the time between reception of incident light by the photodetector (incident light receiving section) 1*a* and activation of the output control section 1*i*-2 and the time between activation of the driver circuit 1*j* and output of a light signal from the laser diode 1*c* are approximately zero. The output control section 1*i*-2 thus causes, based on an electrical signal, the laser diode (light signal providing section) 1*c* to output a light signal after a predetermined delay time since the photodetector (incident light receiving section) 1*a* has received incident light.

Next will be described an operation according to the fifth embodiment.

In order to test whether or not the optical measuring instrument 2 can accurately measure the distance D1, the optical testing apparatus 1 having the coupler 5 is first disposed in front of the optical measuring instrument 2.

The optical measuring instrument 2 is then moved manually to roughly align the optical detector 1*a* and the optical axis of the incident light (S20 in FIG. 21). The instrument moving section 3 is further caused to move the optical measuring instrument 2 (S22 in FIG. 21) to remove the misalignment of the optical axis of the incident light with respect to the photodetector 1*a*. That is, the optical measuring instrument 2 is moved manually before the instrument moving section 3 moves the optical measuring instrument2. Note that the manual movement of the optical measuring instrument 2 (S20) may be omitted so that the movement of the optical measuring instrument 2 by the instrument moving section 3 (S22) may only be achieved.

Incident light from the light source 2*a* of the optical measuring instrument 2 is provided to the photodetector 1*a* of the optical testing apparatus 1. The incident light is converted through the photodetector 1*a* into an electrical signal and provided via the coupler 1*h* to the power detecting section 1*i*-1 and the output control section 1*i*-2 of the IC 1*i*.

When the power detecting section 1*i*-1 receives the electrical signal and activates the output control section 1*i*-2, the output control section 1*i*-2 delays the electrical signal by a delay time approximately equal to 2×D1/c (e.g. 2×D1/c or 2×(D1−D2)/c) and provides it to the driver circuit 1*j*. When the driver circuit 1*j* activates the laser diode 1*c*, the laser diode 1*c* outputs a light signal. The light signal passes through the lens 1*d*, the optical attenuator 1*e*, and the Galvano mirror if to be provided to the input end 5*a* of the coupler 5. The light signal changes its traveling direction through the coupler 5 to be a direction changed light signal and then emitted from the output ends 5*p*, 5*q* toward the optical measuring instrument 2.

The optical path of the direction changed light signal is redirected by the Galvano mirror 1*g* toward the light receiving section 2*b*. The direction changed light signal passes through the Galvano mirror 1*g* to be provided to the light receiving section 2*b* of the optical measuring instrument 2.

The fifth embodiment exhibits the same advantageous effects as the second embodiment.

Sixth Embodiment

The optical testing apparatus 1 according to a sixth embodiment differs from that of the third embodiment in that an IC 1*i* is used.

The actual use aspect of the optical measuring instrument 2 according to the sixth embodiment is the same as that of the first embodiment and will not be described (see FIG. 1 (*a*)). In the testing use aspect of the optical measuring instrument 2 according to the sixth embodiment, the optical measuring instrument 2 and the optical testing apparatus 1 are used, while neither the incident object 4 nor the coupler 5 is used (see FIG. 11).

Figure 11:
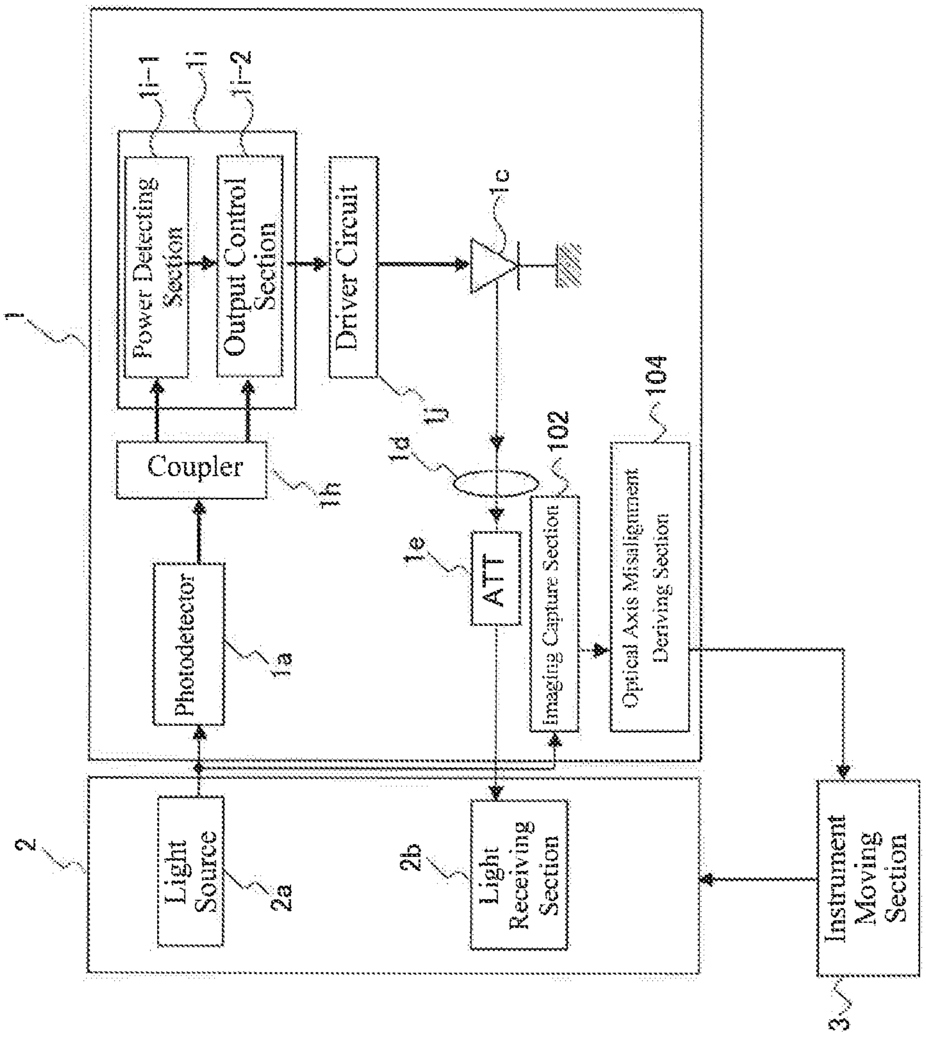
FIG. 11 is a functional block diagram showing the configuration of the optical testing apparatus 1 according to the sixth embodiment of the present invention.

FIG. 11 is a functional block diagram showing the configuration of the optical testing apparatus 1 according to the sixth embodiment of the present invention. The optical testing apparatus 1 according to the sixth embodiment includes a photodetector (incident light receiving section) 1*a*, a laser diode (light signal providing section) 1*c*, a lens 1*d*, an optical attenuator 1*e*, a coupler 1*h*, an IC 1*i*, a driver circuit 1*j*, an imaging capture section 102, and an optical axis misalignment deriving section 104.

Components identical to those in the third embodiment will be designated by the same symbols to omit the description thereof.

The photodetector (incident light receiving section) 1*a*, the lens 1*d*, the optical attenuator 1*e*, the imaging capture section 102, and the optical axis misalignment deriving section 104 are the same as those in the third embodiment and will not be described.

The coupler 1*h* is arranged to branch an electrical signal output from the photodetector 1*a* into two signals and provide them to a power detecting section 1*i*-1 and an output control section 1*i*-2 of the IC 1*i*.

The IC 1*i* is an integrated circuit having the power detecting section 1*i*-1 and the output control section 1*i*-2.

The power detecting section 1*i*-1 is arranged to receive an electrical signal and determine whether or not the power of incident light is within a predetermined range. The power detecting section 1*i*-1 is arranged to activate the output control section 1*i*-2 if the power of incident light is within the predetermined range. The output control section 1*i*-2 is arranged to receive an electrical signal and activate the driver circuit 1*j* after a predetermined delay time (as in the first embodiment).

The driver circuit 1*j* is arranged to activate the laser diode 1*c*.

The laser diode (light signal providing section) 1*c* is arranged to output a light signal (e.g. a laser beam).

It is noted that both the time between reception of incident light by the photodetector (incident light receiving section) 1*a* and activation of the output control section 1*i*-2 and the time between activation of the driver circuit 1*j* and output of a light signal from the laser diode 1*c* are approximately zero. The output control section 1*i*-2 thus causes, based on an electrical signal, the laser diode (light signal providing section) 1*c* to output a light signal after a predetermined delay time since the photodetector (incident light receiving section) 1*a* has received incident light.

Next will be described an operation according to the sixth embodiment.

In order to test whether or not the optical measuring instrument 2 can accurately measure the distance D1, the optical testing apparatus 1 is first disposed in front of the optical measuring instrument 2.

The optical measuring instrument 2 is then moved manually to roughly align the optical detector 1*a* and the optical axis of the incident light (S20 in FIG. 21). The instrument moving section 3 is further caused to move the optical measuring instrument 2 (S22 in FIG. 21) to remove the misalignment of the optical axis of the incident light with respect to the photodetector 1*a*. That is, the optical measuring instrument 2 is moved manually before the instrument moving section 3 moves the optical measuring instrument2. Note that the manual movement of the optical measuring instrument 2 (S20) may be omitted so that the movement of the optical measuring instrument 2 by the instrument moving section 3 (S22) may only be achieved.

Incident light from the light source 2*a* of the optical measuring instrument 2 is provided to the photodetector 1*a* of the optical testing apparatus 1. The incident light is converted through the photodetector 1*a* into an electrical signal and provided via the coupler 1*h* to the power detecting section 1*i*-1 and the output control section 1*i*-2 of the IC 1*i*.

When the power detecting section 1*i*-1 receives the electrical signal and activates the output control section 1*i*-2, the output control section 1*i*-2 delays the electrical signal by a delay time approximately equal to 2×D1/c and provides it to the driver circuit 1*j*.

When the driver circuit 1*j* activates the laser diode 1*c*, the laser diode 1*c* outputs a light signal. The light signal passes through the lens 1*d* and the optical attenuator 1*e* to be provided to the light receiving section 2*b* of the optical measuring instrument 2.

The sixth embodiment exhibits the same advantageous effects as the third embodiment.

Seventh Embodiment

The optical testing apparatus 1 according to a seventh embodiment differs from that of the first embodiment in that an optical fiber (light signal providing section and incident light delay section) 1*k* is used in place of the photodetector 1*a*, the variable delay element 1*b*, and the laser diode 1*c*.

The actual use aspect and the testing use aspect of the optical measuring instrument 2 according to the seventh embodiment are the same as those of the first embodiment and will not be described (see FIG. 1).

Figure 12:
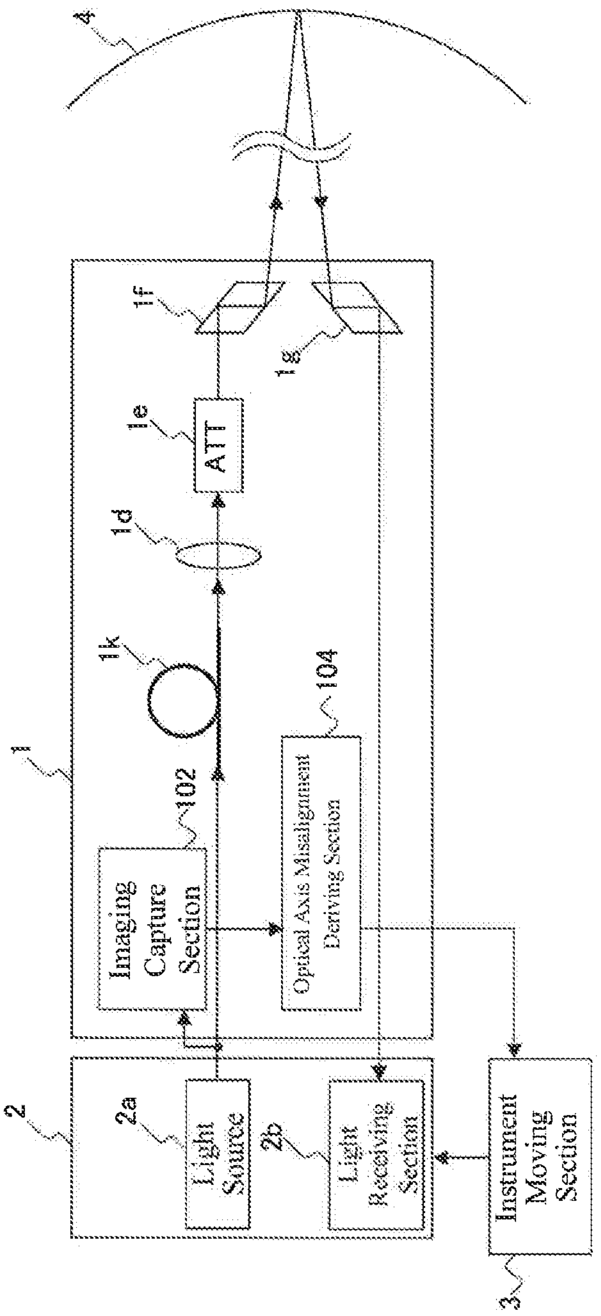
FIG. 12 is a functional block diagram showing the configuration of the optical testing apparatus 1 according to the seventh embodiment of the present invention.

FIG. 12 is a functional block diagram showing the configuration of the optical testing apparatus 1 according to the seventh embodiment of the present invention. The optical testing apparatus 1 according to the seventh embodiment includes an optical fiber (light signal providing section and incident light delay section) 1*k*, a lens 1*d*, an optical attenuator 1*e*, Galvano mirrors 1*f*, 1*g*, an imaging capture section 102, and an optical axis misalignment deriving section 104. Components identical to those in the first embodiment will be designated by the same symbols to omit the description thereof.

The lens 1*d*, the optical attenuator 1*e*, the Galvano mirrors 1*f*, 1*g*, the imaging capture section 102, and the optical axis misalignment deriving section 104 are the same as those in the first embodiment and will not be described. However, the photodetector 1*a* and the center 1*ac* in the first embodiment are replaced, respectively, by the optical fiber 1*k* and its core.

In the optical fiber (light signal providing section and incident light delay section) 1*k*, incident light is delayed by a predetermined delay time (as in the first embodiment) to be a light signal. It is noted that the delay time that can be achieved through the optical fiber 1*k* is (refractive index of the optical fiber 1*k*)×(length of the optical fiber 1*k*)/*c*. If the distance D1 is 200 m, the length of the optical fiber 1*k* is approximately 270 m, which can be achieved by a bobbin-type optical fiber with a diameter of about 10 cm.

Next will be described an operation according to the seventh embodiment.

In order to test whether or not the optical measuring instrument 2 can accurately measure the distance D1, the optical testing apparatus 1 is first disposed between the optical measuring instrument 2 and the incident object 4 (see FIG. 1 (*b*)).

The optical measuring instrument 2 is then moved manually to roughly align the optical detector 1*a* and the optical axis of the incident light (S20 in FIG. 21). The instrument moving section 3 is further caused to move the optical measuring instrument 2 (S22 in FIG. 21) to remove the misalignment of the optical axis of the incident light with respect to the photodetector 1*a*. That is, the optical measuring instrument 2 is moved manually before the instrument moving section 3 moves the optical measuring instrument2. Note that the manual movement of the optical measuring instrument 2 (S20) may be omitted so that the movement of the optical measuring instrument 2 by the instrument moving section 3 (S22) may only be achieved.

Incident light from the light source 2*a* of the optical measuring instrument 2 is provided to the optical fiber 1*k* of the optical testing apparatus 1. The incident light is delayed by a delay time approximately equal to 2×D1/c (e.g. 2×D1/c or 2×(D1−D2)/c) through the optical fiber 1*k* to be a light signal. The light signal passes through the lens 1*d*, the optical attenuator 1*e*, and the Galvano mirror if to be provided to approximately the center of the incident object 4. The light signal is reflected at the incident object 4 to be a reflected light signal.

The optical path of the reflected light signal is redirected by the Galvano mirror 1*g* toward the light receiving section 2*b*. The reflected light signal passes through the Galvano mirror 1*g* to be provided to the light receiving section 2*b* of the optical measuring instrument 2.

The seventh embodiment exhibits the same advantageous effects as the first embodiment.

It is noted that while the seventh embodiment describes the case where the optical fiber 1*k* is used, a multi-reflection cell or a multi-reflection fiber may be used in place of the optical fiber 1*k*.

Multi-reflection cell is also called Herriott cell, in which a signal is output after multiple reflections between opposed concave mirrors. The delay time that can be achieved through the multi-reflection cell is (the number of multiple reflections within the multi-reflection cell)×(the spacing between the opposed concave mirrors within the multi-reflection cell)/c.

A multi-reflection fiber is obtained by coating the ends of an optical fiber with reflective material. Note that the reflective material is not intended for total reflection. The delay time T1 that can be achieved through a multi-reflection fiber is 2×(the refractive index of the multi-reflection fiber)×(the length of the multi-reflection fiber)/c. Light pulses, if provided to the input end of a multi-reflection fiber, are output at the output end of the multi-reflection fiber at intervals of the delay time T1.

It is noted that an optical switch may be provided to connect the output end of the multi-reflection fiber to total reflective material or a portion of output of a light signal to the lens 1*d*. The optical switch connects the output end of the multi-reflection fiber to the total reflective material until light travels back and forth predetermined times (m times) between the input end of the multi-reflection fiber and the total reflective material and then connects the output end to the portion of output of a light signal to the lens 1*d*. In this case, the delay time T2 that can be achieved through the multi-reflection fiber is 2×m×(the refractive index of the multi-reflection fiber)×(the length of the multi-reflection fiber)/c.

Eighth Embodiment

The optical testing apparatus 1 according to an eighth embodiment differs from that of the second embodiment in that an optical fiber (light signal providing section and incident light delay section) 1*k* is used in place of the photodetector 1*a*, the variable delay element 1*b*, and the laser diode 1*c*.

The actual use aspect and the testing use aspect of the optical measuring instrument 2 according to the eighth embodiment are the same as those of the second embodiment and will not be described (see FIG. 1; note that the coupler 5 is used in place of the incident object 4). Note that the coupler 5 should be included in the optical testing apparatus 1 (see FIG. 13).

Figure 13:
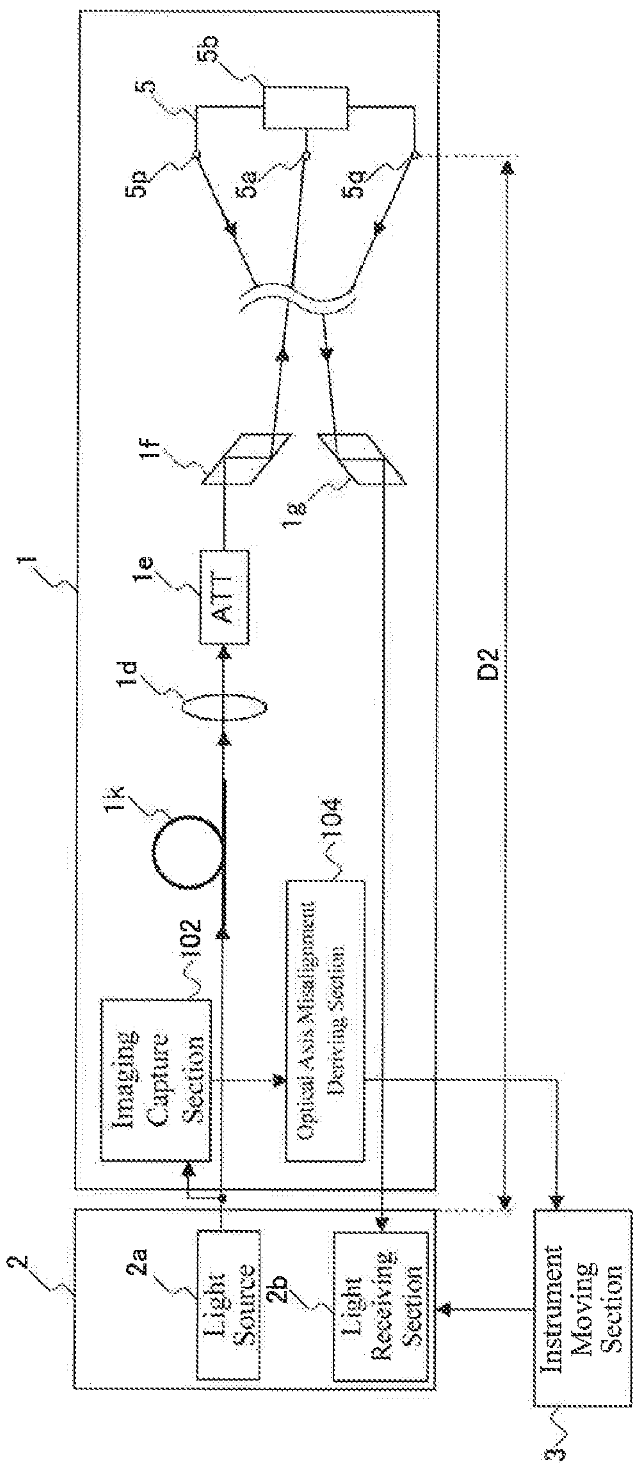
FIG. 13 is a functional block diagram showing the configuration of the optical testing apparatus 1 according to the eighth embodiment of the present invention.

FIG. 13 is a functional block diagram showing the configuration of the optical testing apparatus 1 according to the eighth embodiment of the present invention. The optical testing apparatus 1 according to the eighth embodiment includes an optical fiber (light signal providing section and incident light delay section) 1*k*, a lens 1*d*, an optical attenuator 1*e*, Galvano mirrors 1*f*, 1*g*, an imaging capture section 102, an optical axis misalignment deriving section 104, and a coupler (light traveling direction changing section) 5. The coupler 5 has an input end 5*a*, a branch section 5*b*, and output ends 5*p*, Sq. Components identical to those in the second embodiment will be designated by the same symbols to omit the description thereof.

The lens 1*d*, the optical attenuator 1*e*, the Galvano mirrors 1*f*, 1*g*, the imaging capture section 102, the optical axis misalignment deriving section 104, and the coupler 5 are the same as those in the second embodiment and will not be described. However, the photodetector 1*a* and the center 1*ac* in the second embodiment are replaced, respectively, by the optical fiber 1*k* and its core.

In the optical fiber (light signal providing section and incident light delay section) 1*k*, incident light is delayed by a predetermined delay time (as in the first embodiment) to be a light signal. It is noted that the delay time that can be achieved through the optical fiber 1*k* is (refractive index of the optical fiber 1*k*)×(length of the optical fiber 1*k*)/*c*. If the distance D1 is 200 m, the length of the optical fiber 1*k* is approximately 270 m, which can be achieved by a bobbin-type optical fiber with a diameter of about 10 cm.

Next will be described an operation according to the eighth embodiment.

In order to test whether or not the optical measuring instrument 2 can accurately measure the distance D1, the optical testing apparatus 1 having the coupler 5 is first disposed in front of the optical measuring instrument 2.

The optical measuring instrument 2 is then moved manually to roughly align the optical detector 1*a* and the optical axis of the incident light (S20 in FIG. 21). The instrument moving section 3 is further caused to move the optical measuring instrument 2 (S22 in FIG. 21) to remove the misalignment of the optical axis of the incident light with respect to the photodetector 1*a*. That is, the optical measuring instrument 2 is moved manually before the instrument moving section 3 moves the optical measuring instrument2.

Note that the manual movement of the optical measuring instrument 2 (S20) may be omitted so that the movement of the optical measuring instrument 2 by the instrument moving section 3 (S22) may only be achieved.

Incident light from the light source 2*a* of the optical measuring instrument 2 is provided to the optical fiber 1*k* of the optical testing apparatus 1. The incident light is delayed by a delay time approximately equal to 2×D1/c (e.g. 2×D1/c or 2×(D1−D2)/c) through the optical fiber 1*k* to be a light signal. The light signal passes through the lens 1*d*, the optical attenuator 1*e*, and the Galvano mirror 1*f* to be provided to the input end 5*a* of the coupler 5. The light signal changes its traveling direction through the coupler 5 to be a direction changed light signal and then emitted from the output ends 5*p*, 5*q* toward the optical measuring instrument 2.

The optical path of the direction changed light signal is redirected by the Galvano mirror 1*g* toward the light receiving section 2*b*. The direction changed light signal passes through the Galvano mirror 1*g* to be provided to the light receiving section 2*b* of the optical measuring instrument 2.

The eighth embodiment exhibits the same advantageous effects as the second embodiment.

It is noted that while the eighth embodiment describes the case where the optical fiber 1*k* is used, a multi-reflection cell or a multi-reflection fiber may be used in place of the optical fiber 1*k*.

Multi-reflection cell is also called Herriott cell, in which a signal is output after multiple reflections between opposed concave mirrors. The delay time that can be achieved through the multi-reflection cell is (the number of multiple reflections within the multi-reflection cell)×(the spacing between the opposed concave mirrors within the multi-reflection cell)/c.

A multi-reflection fiber is obtained by coating the ends of an optical fiber with reflective material. Note that the reflective material is not intended for total reflection. The delay time T1 that can be achieved through a multi-reflection fiber is 2×(the refractive index of the multi-reflection fiber)×(the length of the multi-reflection fiber)/c. Light pulses, if provided to the input end of a multi-reflection fiber, are output at the output end of the multi-reflection fiber at intervals of the delay time T1.

It is noted that an optical switch may be provided to connect the output end of the multi-reflection fiber to total reflective material or a portion of output of a light signal to the lens 1*d*. The optical switch connects the output end of the multi-reflection fiber to the total reflective material until light travels back and forth predetermined times (m times) between the input end of the multi-reflection fiber and the total reflective material and then connects the output end to the portion of output of a light signal to the lens 1*d*. In this case, the delay time T2 that can be achieved through the multi-reflection fiber is 2×m×(the refractive index of the multi-reflection fiber)×(the length of the multi-reflection fiber)/c.

Ninth Embodiment

The optical testing apparatus 1 according to a ninth embodiment differs from that of the third embodiment in that an optical fiber (light signal providing section and incident light delay section) 1*k* is used in place of the photodetector 1*a*, the variable delay element 1*b*, and the laser diode 1*c*.

The actual use aspect of the optical measuring instrument 2 according to the ninth embodiment is the same as that of the third embodiment and will not be described.

Figure 14:
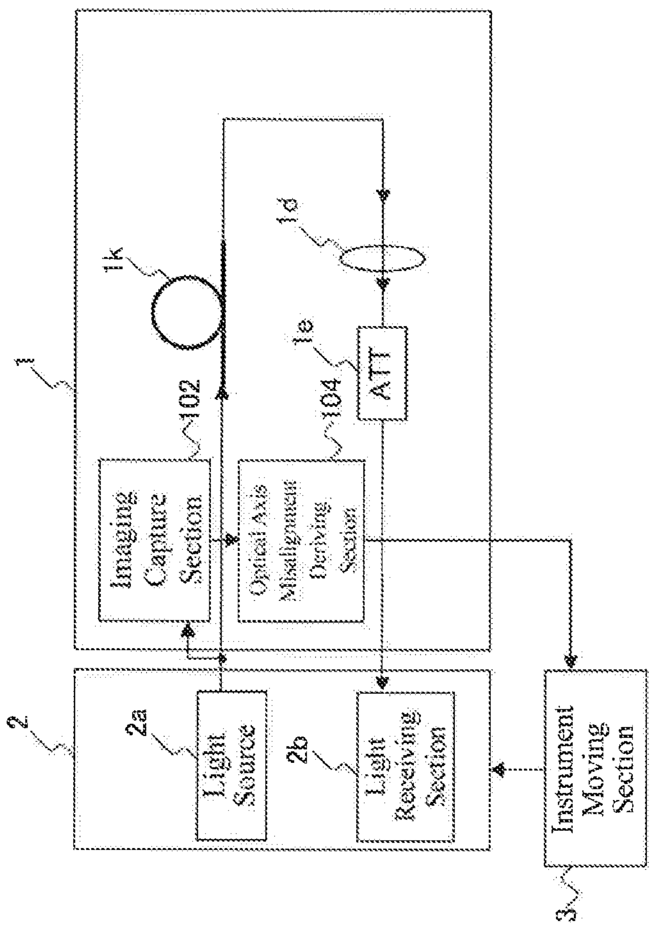
FIG. 14 is a functional block diagram showing the configuration of the optical testing apparatus 1 according to the ninth embodiment of the present invention.

FIG. 14 is a functional block diagram showing the configuration of the optical testing apparatus 1 according to the ninth embodiment of the present invention. The optical testing apparatus 1 according to the ninth embodiment includes an optical fiber (light signal providing section and incident light delay section) 1*k*, a lens 1*d*, an optical attenuator 1*e*, an imaging capture section 102, and an optical axis misalignment deriving section 104. Components identical to those in the third embodiment will be designated by the same symbols to omit the description thereof.

The lens 1*d*, the optical attenuator 1*e*, the imaging capture section 102, and the optical axis misalignment deriving section 104 are the same as those in the third embodiment and will not be described. However, the photodetector 1*a* and the center 1*ac* in the third embodiment are replaced, respectively, by the optical fiber 1*k* and its core.

In the optical fiber (light signal providing section and incident light delay section) 1*k*, incident light is delayed by a predetermined delay time (as in the first embodiment) to be a light signal. It is noted that the delay time that can be achieved through the optical fiber 1*k* is (refractive index of the optical fiber 1*k*)×(length of the optical fiber 1*k*)/c. If the distance D1 is 200 m, the length of the optical fiber 1*k* is approximately 270 m, which can be achieved by a bobbin-type optical fiber with a diameter of about 10 cm.

Next will be described an operation according to the ninth embodiment.

In order to test whether or not the optical measuring instrument 2 can accurately measure the distance D1, the optical testing apparatus 1 is first disposed in front of the optical measuring instrument 2.

The optical measuring instrument 2 is then moved manually to roughly align the optical detector 1*a* and the optical axis of the incident light (S20 in FIG. 21). The instrument moving section 3 is further caused to move the optical measuring instrument 2 (S22 in FIG. 21) to remove the misalignment of the optical axis of the incident light with respect to the photodetector 1*a*. That is, the optical measuring instrument 2 is moved manually before the instrument moving section 3 moves the optical measuring instrument2. Note that the manual movement of the optical measuring instrument 2 (S20) may be omitted so that the movement of the optical measuring instrument 2 by the instrument moving section 3 (S22) may only be achieved.

Incident light from the light source 2*a* of the optical measuring instrument 2 is provided to the optical fiber 1*k* of the optical testing apparatus 1. The incident light is delayed by a delay time approximately equal to 2×D1/c (e.g. 2×D1/c or 2×(D1−D2)/c) through the optical fiber 1*k* to be a light signal. The light signal passes through the lens 1*d* and the optical attenuator 1*e* to be provided to the light receiving section 2*b* of the optical measuring instrument 2.

The ninth embodiment exhibits the same advantageous effects as the third embodiment.

It is noted that while the ninth embodiment describes the case where the optical fiber 1*k* is used, a multi-reflection cell or a multi-reflection fiber may be used in place of the optical fiber 1*k*.

Multi-reflection cell is also called Herriott cell, in which a signal is output after multiple reflections between opposed concave mirrors. The delay time that can be achieved through the multi-reflection cell is (the number of multiple reflections within the multi-reflection cell)×(the spacing between the opposed concave mirrors within the multi-reflection cell)/c.

A multi-reflection fiber is obtained by coating the ends of an optical fiber with reflective material. Note that the reflective material is not intended for total reflection. The delay time T1 that can be achieved through a multi-reflection fiber is 2×(the refractive index of the multi-reflection fiber)×(the length of the multi-reflection fiber)/c. Light pulses, if provided to the input end of a multi-reflection fiber, are output at the output end of the multi-reflection fiber at intervals of the delay time T1.

It is noted that an optical switch may be provided to connect the output end of the multi-reflection fiber to total reflective material or a portion of output of a light signal to the lens 1*d*. The optical switch connects the output end of the multi-reflection fiber to the total reflective material until light travels back and forth predetermined times (m times) between the input end of the multi-reflection fiber and the total reflective material and then connects the output end to the portion of output of a light signal to the lens 1*d*. In this case, the delay time T2 that can be achieved through the multi-reflection fiber is 2×m×(the refractive index of the multi-reflection fiber)×(the length of the multi-reflection fiber)/c.

Tenth Embodiment

Figure 15:
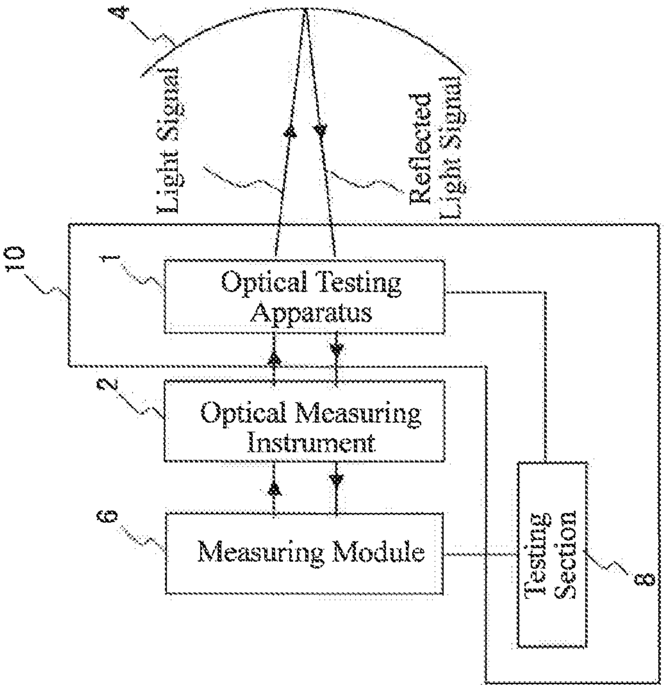
FIG. 15 is a functional block diagram showing the configuration of a semiconductor test apparatus 10 according to a tenth embodiment of the present invention.

FIG. 15 is a functional block diagram showing the configuration of a semiconductor test apparatus 10 according to a tenth embodiment of the present invention. It is noted that the instrument moving section 3 (see FIG. 2) is not shown.

The semiconductor test apparatus (optical test apparatus) 10 according to the tenth embodiment includes an optical testing apparatus 1 and a testing section 8.

The optical testing apparatus 1 is the same as one of those in the above-described embodiments (first to ninth embodiments) and will not be described. It is noted that while an incident object 4 is shown in FIG. 15 (see First, Fourth, and Seventh Embodiments), a coupler 5 may be used in place of the incident object 4 (see Second, Fifth, and Eighth Embodiments) or the incident object 4 may not even be used (see Third, Sixth, and Ninth Embodiments).

A measuring module 6 is arranged to use an optical measuring instrument 2 for measurements. The measuring module 6 is arranged to instruct the optical measuring instrument 2 to emit incident light and receive a reflected light signal. As described in the first embodiment, the measuring module 6 is arranged to measure the distance D1 between the optical measuring instrument 2 and the incident object 4 in an actual use aspect (see FIG. 1 (*a*)). In addition, the measuring module 6 is arranged to measure the responsivity of incident light and a reflected light signal.

The testing section 8 is arranged to conduct a test on measurements by the measuring module 6 using the optical measuring instrument 2. For example, the testing section 8 is arranged to conduct a test on measurements of the responsivity of incident light and reflected light and a test on the accuracy of measurement of the distance D1 between the optical measuring instrument 2 and the incident object 4. It is noted that the testing section 8 is arranged to additionally conduct a function verification test for verifying the function of a control bus, a power supply, etc. and a detection efficiency test for determining whether or not the efficiency of detection of a specific wavelength is within a defined range. The testing section 8 is also arranged to turn ON/OFF incident light from the optical measuring instrument 2, control the power, emission angle, etc. of incident light, set the delay time of the optical testing apparatus 1, control the optical system including the optical attenuator 1*e* for attenuation of optical power, and control the reflectance of the incident object 4.

Eleventh Embodiment

Figure 22:
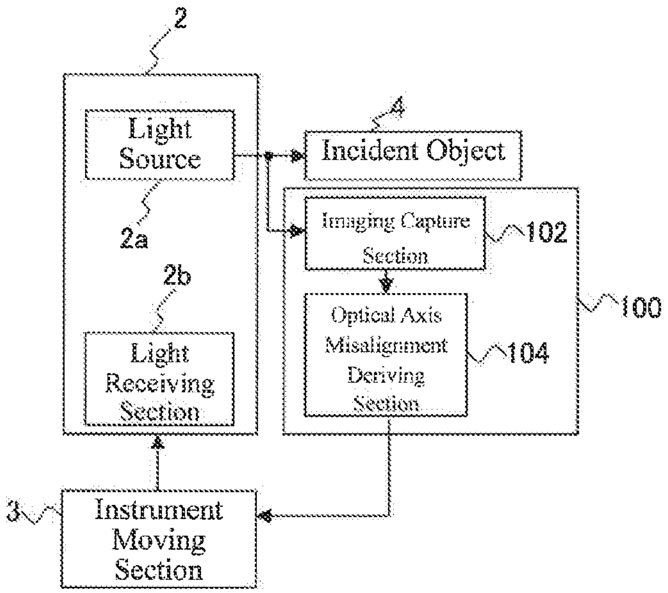
FIG. 22 is a functional block diagram showing the configuration of an optical testing apparatus 1 according to an eleventh embodiment of the present invention.

FIG. 22 is a functional block diagram showing the configuration of an optical testing apparatus 1 according to an eleventh embodiment of the present invention. Note that in FIG. 22, light signal reflection at the incident object 4 (i.e. reflected light signal) is not shown. Also, in FIG. 22, the incident object 4 is shown as a block.

The optical measuring instrument 2 and the incident object 4 are the same as those in FIG. 1 (*a*). For example, if the optical measuring instrument 2 is a LiDAR module, the distance D1 between the optical measuring instrument 2 and the incident object 4 is, for example, 200 m.

The instrument moving section 3 is also the same as that of the first embodiment and will not be described.

The optical testing apparatus 100 according to the eleventh embodiment includes an imaging capture section 102 and an optical axis misalignment deriving section 104.

The imaging capture section 102 is arranged to image incident light. The optical axis misalignment deriving section 104 is arranged to derive misalignment of the optical axis of the incident light with respect to the incident object 4 based on misalignment between the incident object 4 and the imaging capture section 102 as well as an imaging result with the imaging capture section 102. The method for derivation of misalignment of the optical axis of incident light is the same as that in the first embodiment and will not be described (however, the photodetector 1*a* in the first embodiment is replaced by the incident object 4). Misalignment of the optical axis is provided from the optical axis misalignment deriving section 104 to the instrument moving section 3 that is arranged to move the optical measuring instrument 2.

Next will be described an operation according to the eleventh embodiment.

In order to test whether or not the optical measuring instrument 2 can accurately measure the distance D1, the incident object 4 and the optical testing apparatus 1 are first disposed in front of the optical measuring instrument 2 (see FIGS. 1 (*a*) and 22).

The optical measuring instrument 2 is then moved manually to roughly align the incident object 4 and the optical axis of the incident light (S20 in FIG. 21). The instrument moving section 3 is further caused to move the optical measuring instrument 2 (S22 in FIG. 21) to remove the misalignment of the optical axis of the incident light with respect to the incident object 4. That is, the optical measuring instrument 2 is moved manually before the instrument moving section 3 moves the optical measuring instrument2. Note that the manual movement of the optical measuring instrument 2 (S20) may be omitted so that the movement of the optical measuring instrument 2 by the instrument moving section 3 (S22) may only be achieved.

Thereafter, measurements and tests are conducted with the optical measuring instrument 2 under such a condition as shown in FIG. 1 (*a*).

In accordance with the eleventh embodiment, it is possible to remove the misalignment of the optical axis of incident light with respect to the incident object 4.

Twelfth Embodiment

Figure 23:
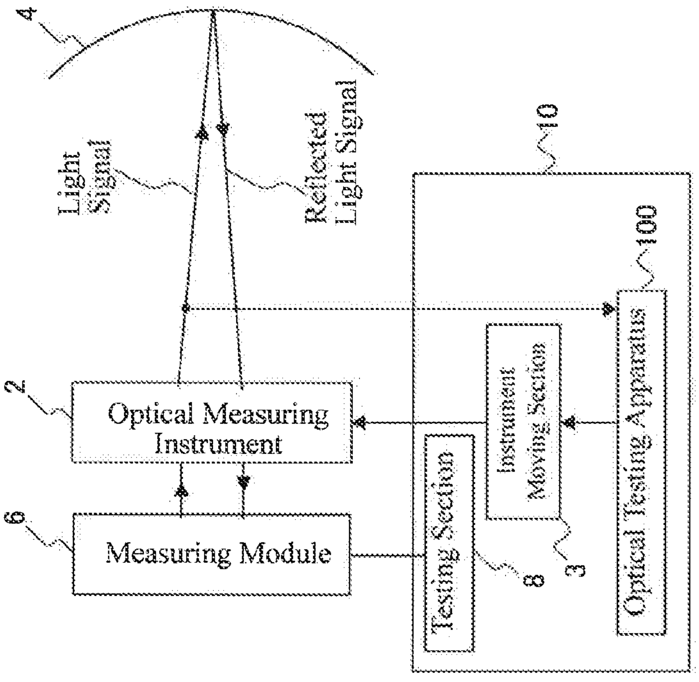
FIG. 23 is a functional block diagram showing the configuration of a semi conductor test apparatus 10 according to a twelfth embodiment of the present invention.

FIG. 23 is a functional block diagram showing the configuration of a semiconductor test apparatus 10 according to a twelfth embodiment of the present invention.

The semiconductor test apparatus (optical test apparatus) 10 according to the twelfth embodiment includes an optical testing apparatus 100, an instrument moving section 3, and a testing section 8.

The optical testing apparatus 100 and the instrument moving section 3 are the same as those of the eleventh embodiment and will not be described.

The measuring module 6 and the testing section 8 are the same as those of the tenth embodiment and will not be described.

Next will be described an operation according to the twelfth embodiment.

In order to test whether or not the optical measuring instrument 2 can accurately measure the distance D1, the incident object 4 and the optical testing apparatus 1 are first disposed in front of the optical measuring instrument 2.

The optical measuring instrument 2 is then moved manually to roughly align the incident object 4 and the optical axis of the incident light (S20 in FIG. 21). The instrument moving section 3 is further caused to move the optical measuring instrument 2 (S22 in FIG. 21) to remove the misalignment of the optical axis of the incident light with respect to the incident object 4. That is, the optical measuring instrument 2 is moved manually before the instrument moving section 3 moves the optical measuring instrument2. Note that the manual movement of the optical measuring instrument 2 (S20) may be omitted so that the movement of the optical measuring instrument 2 by the instrument moving section 3 (S22) may only be achieved.

Thereafter, measurements and tests are conducted with the optical measuring instrument 2 under such a condition as shown in FIG. 1 (*a*).

In accordance with the twelfth embodiment, it is possible to remove the misalignment of the optical axis of incident light with respect to the incident object 4.

DESCRIPTION OF REFERENCE NUMERAL

2 Optical Measuring Instrument
2*a* Light Source
2*b* Light Receiving Section
4 Incident Object
5 Coupler (Light Traveling Direction Changing Section)
5*a* Input End
5*b* Branch Section
5*p*, 5*q* Output Ends
1 Optical Testing Apparatus
1*a* Photodetector (Incident Light Receiving Section)
1*b* Variable Delay Element (Electrical Signal Delay Section)
1*b*-1, 1*b*-2 Delay Elements
1*c* Laser Diode (Light Signal Providing Section)
1*d* Lens
1*e* Optical Attenuator
1*f*, 1*g* Galvano Mirrors
1*h* Coupler
1*i* IC
1*i*-1 Power Detecting Section
1*i*-2 Output Control Section
1*j* Driver Circuit
1*k* Optical Fiber (Light Signal Providing Section and Incident Light Delay Section)
6 Measuring Module
8 Testing Section
10 Semiconductor Test Apparatus
100 Optical Testing Apparatus
102 Imaging Capture Section
104 Optical Axis Misalignment Deriving Section

The invention claimed is:

1. An optical testing apparatus used in testing an optical measuring instrument that provides incident light from a light source to an incident object and receives reflected light as a result of reflection of the incident light at the incident object, the optical testing apparatus comprising:
- an incident light receiving section arranged to receive the incident light;
- a light signal providing section arranged to provide a light signal to an incident object after a predetermined delay time since the incident light receiving section has received the incident light;
- an imaging capture section arranged to image the incident light; and
- an optical axis misalignment deriving section arranged to derive a misalignment of the optical axis of the incident light with respect to the incident light receiving section based on misalignment between the incident light receiving section and the imaging capture section as well as an imaging result with the imaging capture section, wherein
- a reflected light signal is provided to the optical measuring instrument as a result of reflection of the light signal at the incident object, and
- the predetermined delay time is approximately equal to a time between emission of the incident light from the light source and reception of the reflected light by the optical measuring instrument in a case of actually using the optical measuring instrument, wherein
- the misalignment of the optical axis is provided to an instrument moving section arranged to move the optical measuring instrument, and
- the instrument moving section is arranged to move the optical measuring instrument such that the misalignment of the optical axis of the incident light is removed.

2. The optical testing apparatus according to claim 1, wherein
- the instrument moving section is arranged to move the optical measuring instrument in a plane orthogonal to the optical axis of the incident light.

3. The optical testing apparatus according to claim 1, wherein
- the instrument moving section is arranged to rotate the optical measuring instrument around a rotational axis orthogonal to the optical axis of the incident light.

4. The optical testing apparatus according to claim 1, wherein
- the optical measuring instrument is moved manually before the instrument moving section moves the optical measuring instrument.

5. An optical testing apparatus used in testing an optical measuring instrument that provides an incident light from a light source to an incident object and receives reflected light as a result of reflection of the incident light at the incident object, the optical testing apparatus comprising:
- an incident light receiving section arranged to receive the incident light;
- a light signal providing section arranged to output a light signal after a predetermined delay time since the incident light receiving section has received the incident light;
- a light traveling direction changing section arranged to emit the light signal toward the optical measuring instrument;
- an imaging capture section arranged to image the incident light; and an optical axis misalignment deriving section arranged to derive a misalignment of the optical axis of the incident light with respect to the incident light receiving section based on misalignment between the incident light receiving section and the imaging capture section as well as an imaging result with the imaging capture section, wherein a direction changed light signal is provided to the optical measuring instrument as a result of a change in a traveling direction of the light signal at the light traveling direction changing section, and the predetermined delay time is approximately equal to a time between emission of the incident light from the light source and reception of the reflected light by the optical measuring instrument in a case of actually using the optical measuring instrument, wherein the misalignment of the optical axis is provided to an instrument moving section arranged to move the optical measuring instrument, and the instrument moving section is arranged to move the optical measuring instrument such that the misalignment of the optical axis of the incident light is removed.

6. The optical testing apparatus according to claim 5, wherein the instrument moving section is arranged to move the optical measuring instrument in a plane orthogonal to the optical axis of the incident light.

7. The optical testing apparatus according to claim 5, wherein the instrument moving section is arranged to rotate the optical measuring instrument around a rotational axis orthogonal to the optical axis of the incident light.

8. The optical testing apparatus according to claim 5, wherein the optical measuring instrument is moved manually before the instrument moving section moves the optical measuring instrument.

9. An optical testing apparatus used in testing an optical measuring instrument that provides an incident light from a light source to an incident object and receives a reflected light as a result of reflection of the incident light at the incident object, the optical testing apparatus comprising:

an incident light receiving section arranged to receive the incident light;

a light signal providing section arranged to provide a light signal to the optical measuring instrument after a predetermined delay time since the incident light receiving section has received the incident light;

an imaging capture section arranged to image the incident light; and an optical axis misalignment deriving section arranged to derive a misalignment of the optical axis of the incident light with respect to the incident light receiving section based on a misalignment between the incident light receiving section and the imaging capture section as well as an imaging result with the imaging capture section, wherein the predetermined delay time is approximately equal to a time between emission of the incident light from the light source and reception of the reflected light by the optical measuring instrument in a case of actually using the optical measuring instrument, wherein the misalignment of the optical axis is provided to an instrument moving section arranged to move the optical measuring instrument, and the instrument moving section is arranged to move the optical measuring instrument such that the misalignment of the optical axis of the incident light is removed.

10. The optical testing apparatus according to claim 9, wherein the instrument moving section is arranged to move the optical measuring instrument in a plane orthogonal to the optical axis of the incident light.

11. The optical testing apparatus according to claim 9, wherein the instrument moving section is arranged to rotate the optical measuring instrument around a rotational axis orthogonal to the optical axis of the incident light.

12. The optical testing apparatus according to claim 9, wherein the optical measuring instrument is moved manually before the instrument moving section moves the optical measuring instrument.

13. An optical testing apparatus used in testing an optical measuring instrument that provides incident light from a light source to an incident object and receives a reflected light as a result of reflection of the incident light at the incident object, the optical testing apparatus comprising:

an imaging capture section arranged to image the incident light; and an optical axis misalignment deriving section arranged to derive misalignment of the optical axis of the incident light with respect to the incident object based on a misalignment between the incident object and the imaging capture section as well as an imaging result with the imaging capture section, wherein the misalignment of the optical axis is provided to an instrument moving section arranged to move the optical measuring instrument, and the instrument moving section is arranged to move the optical measuring instrument such that the misalignment of the optical axis of the incident light is removed.

14. The optical testing apparatus according to claim 13, wherein the instrument moving section is arranged to move the optical measuring instrument in a plane orthogonal to the optical axis of the incident light.

15. The optical testing apparatus according to claim 13, wherein the instrument moving section is arranged to rotate the optical measuring instrument around a rotational axis orthogonal to the optical axis of the incident light.

16. The optical testing apparatus according to claim 13, wherein the optical measuring instrument is moved manually before the instrument moving section moves the optical measuring instrument.

* * * * *